United States Patent
Ali et al.

(10) Patent No.: US 12,500,714 B2
(45) Date of Patent: Dec. 16, 2025

(54) RECEIVING CSI-RS AND PDSCH USING MULTIPLE DFTS

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 262 days.

(21) Appl. No.: 18/264,917

(22) PCT Filed: Feb. 9, 2022

(86) PCT No.: PCT/IB2022/051175
§ 371 (c)(1),
(2) Date: Aug. 9, 2023

(87) PCT Pub. No.: WO2022/172177
PCT Pub. Date: Aug. 18, 2022

(65) Prior Publication Data
US 2024/0137170 A1    Apr. 25, 2024
US 2024/0235758 A9    Jul. 11, 2024

Related U.S. Application Data

(60) Provisional application No. 63/147,670, filed on Feb. 9, 2021.

(51) Int. Cl.
*H04L 5/00* (2006.01)
*H04L 27/26* (2006.01)

(52) U.S. Cl.
CPC ........ *H04L 5/0048* (2013.01); *H04L 27/2613* (2013.01); *H04L 27/2636* (2013.01)

(58) Field of Classification Search
None
See application file for complete search history.

(56) References Cited

U.S. PATENT DOCUMENTS 10,064,169 B2    8/2018    Bai et al.
11,259,321 B2 *  2/2022    Mukherjee ........ H04W 72/0453
(Continued)

FOREIGN PATENT DOCUMENTS

EP    3471317 A1    4/2019
WO    2018045028 A1    3/2018
(Continued)

OTHER PUBLICATIONS

PCT/IB2022/051175, "Notification of Transmittal of the International Search Report and the Written Opinion of the International Searching Authority, or the Declaration", International Searching Authority, May 13, 2022, pp. 1-15.
Intel Corp., "On CSI-RS for Beam Management", 3GPP TSG RAN WG1 NR Ad Hoc Meeting R1-1710532, Jun. 27-30, 2017, pp. 1-5.
3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

(Continued)

*Primary Examiner* — Otis L Thompson, Jr.
(74) *Attorney, Agent, or Firm* — Kunzler Bean & Adamson

(57) ABSTRACT

Apparatuses, methods, and systems are disclosed for CSI-RS enhancement. One apparatus includes a transceiver and a processor that receives a first configuration comprising a configuration of indices and a length of at least one first DFT for mapping on CSI-RS symbols, and/or a configuration of a number and a length of at least one second DFT for CSI-RS transmission. The processor receives a CSI-RS transmission and a PDSCH transmission during a symbol by applying multiple DFTs based on the first configuration. The processor generates a CSI report based on the received CSI-RS and transmits the generated CSI report to the network entity.

15 Claims, 12 Drawing Sheets

(56) References Cited

U.S. PATENT DOCUMENTS

| | | | |
|---|---|---|---|
| 2018/0145737 A1* | 5/2018 | Rahman | H04B 7/06956 |
| 2018/0219664 A1* | 8/2018 | Guo | H04W 24/10 |
| 2019/0158331 A1* | 5/2019 | Pawar | H04L 27/2605 |
| 2020/0244503 A1 | 7/2020 | Bala et al. | |
| 2020/0313835 A1* | 10/2020 | Ji | H04L 5/0053 |
| 2020/0403675 A1 | 12/2020 | Yang et al. | |
| 2021/0297223 A1* | 9/2021 | Yang | H04L 1/1664 |
| 2022/0217756 A1* | 7/2022 | Wu | H04L 1/1861 |
| 2022/0264492 A1* | 8/2022 | Kim | H04L 27/2607 |
| 2022/0287012 A1* | 9/2022 | Kim | H04L 5/0053 |
| 2022/0345261 A1* | 10/2022 | Ali | H04L 5/0048 |
| 2024/0137170 A1* | 4/2024 | Ali | H04L 27/26134 |

FOREIGN PATENT DOCUMENTS

| | | |
|---|---|---|
| WO | 2018093567 A1 | 5/2018 |
| WO | 2020244728 A1 | 12/2020 |
| WO | 2021009876 A1 | 1/2021 |

OTHER PUBLICATIONS

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

\* cited by examiner

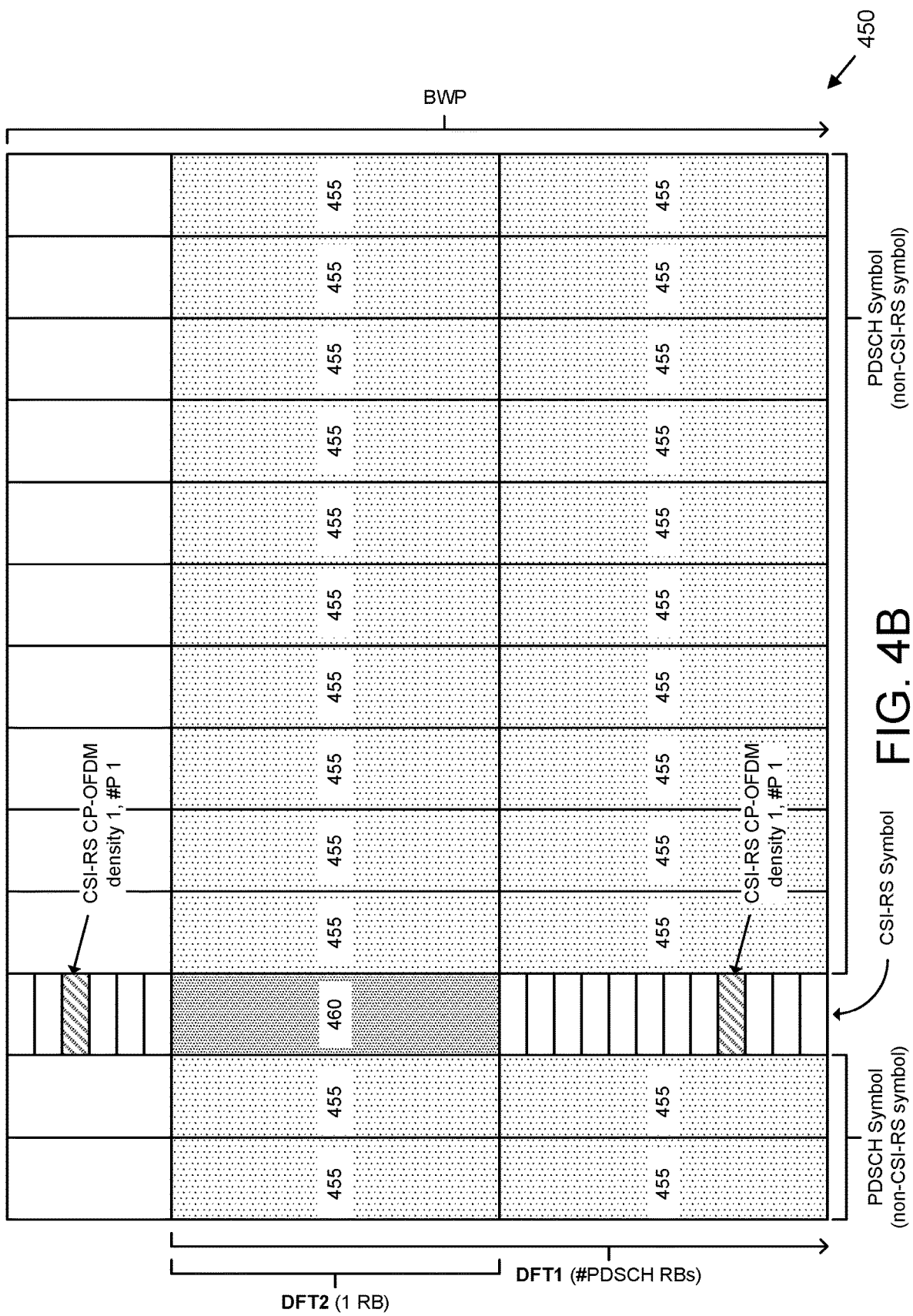

RECEIVING CSI-RS AND PDSCH USING MULTIPLE DFTS

CROSS-REFERENCE TO RELATED APPLICATIONS

This application claims priority to U.S. Provisional Patent Application No. 63/147,670 entitled "CSI-RS ENHANCEMENTS FOR HIGH FREQUENCIES" and filed on Feb. 9, 2021 for Ali Ali, Ankit Bhamri, and Sher Ali Cheema, which application is incorporated herein by reference.

FIELD

The subject matter disclosed herein relates generally to wireless communications and more particularly relates to Channel State Information ("CSI") enhancements for high frequencies, e.g., from 52.6 GHz to 71 GHz and beyond 71 GHz.

BACKGROUND

In certain wireless communication systems, Cyclic Prefix Orthogonal Frequency Division Multiplexing ("CP-OFDM") may be used for downlink ("DL") as well as for uplink ("UL"). In certain wireless communication systems, Discrete Fourier Transform Spread Orthogonal Frequency Division Multiplexing ("DFT-s-OFDM") may be used for UL. However, CP-OFDM performance degrades at high frequencies (e.g., beyond 52.6 GHz) due to its sensitivity to phase noise and its high Peak-to-Average Power Ratio ("PAPR").

BRIEF SUMMARY

Disclosed are procedures for CSI-RS enhancement. Said procedures may be implemented by apparatus, systems, methods, or computer program products.

One method at a User Equipment ("UE") for channel state information ("CSI") reporting includes receiving, from a network entity, a first configuration comprising at least one of: A) a configuration of indices and a length of one or more first discrete Fourier transforms ("DFTs") for mapping physical downlink shared channel ("PDSCH") on Channel State Information Reference Signal ("CSI-RS") symbols and B) a configuration of a number and a length of one or more second DFTs for CSI-RS transmission. The method includes receiving a CSI reference signal ("CSI-RS") transmission and a physical downlink shared channel ("PDSCH") transmission during a symbol by applying multiple DFTs based on the first configuration. The method includes generating a CSI report based on the received CSI-RS and transmitting the generated CSI report to the network entity.

One method at a radio access network ("RAN") for CSI-RS enhancement includes transmitting a first configuration to a communication device (i.e., to a UE), the first configuration including one or more of: A) a configuration of indices and a length of one or more first DFTs for mapping PDSCH on CSI-RS symbols, and B) a configuration of a number and a length of one or more DFTs for CSI-RS transmission. The method includes transmitting a CSI-RS transmission and a PDSCH transmission during a symbol by applying multiple DFTs based on the configuration and receiving, from the communication device, a CSI report based on the transmitted CSI-RS.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4B is a diagram illustrating one embodiment of DFT-s-OFDM-based PDSCH multiplexed with CSI-RS on a same symbol;

DETAILED DESCRIPTION

Figure 1:
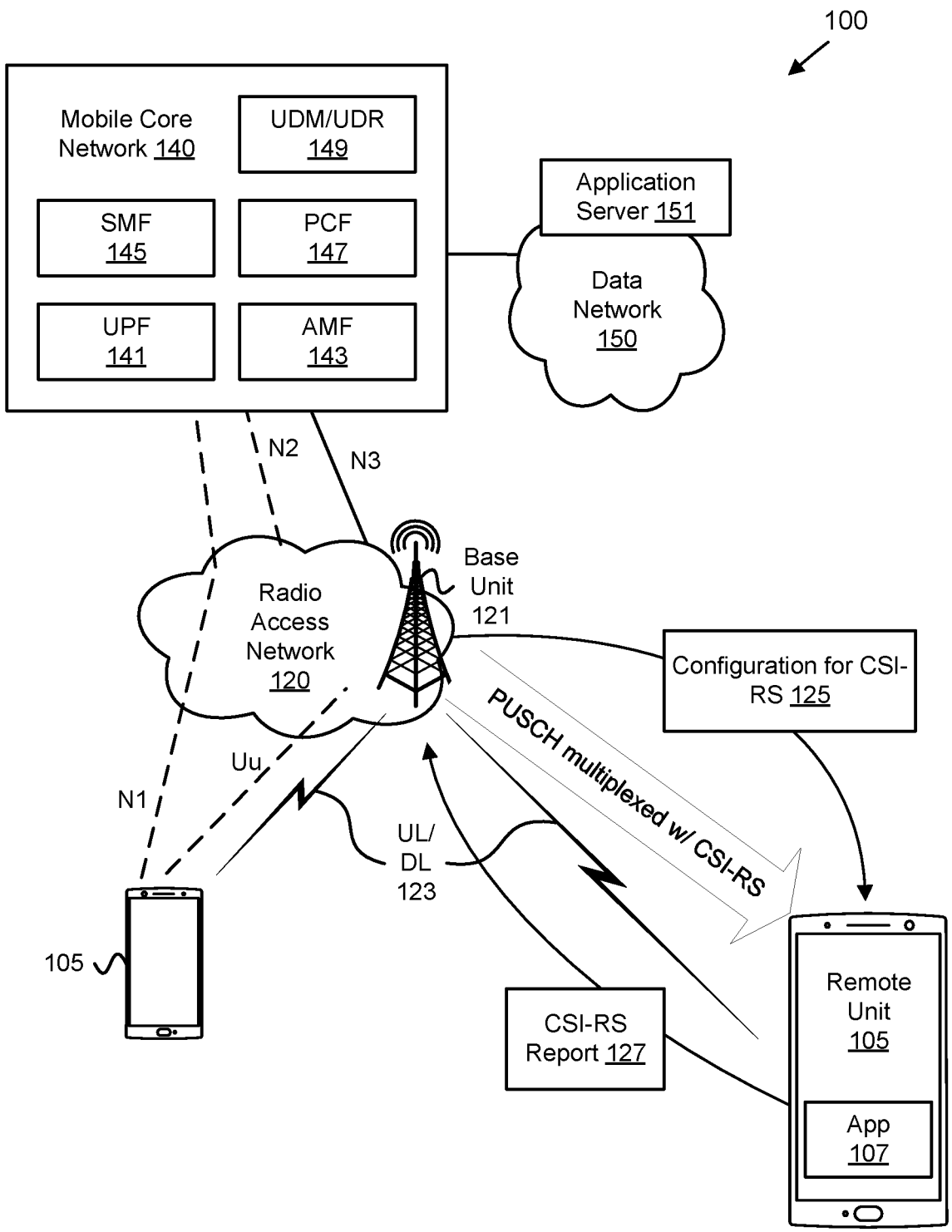
FIG. 1 is a block diagram illustrating one embodiment of a wireless communication system for CSI-RS enhancement.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for Channel State Information ("CSI") enhancements for high frequencies, e.g., from 52.6 GHz to 71 GHz and beyond 71 GHz. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Wireless networks employing Fifth-Generation ("5G") New Radio ("NR") radio access technologies ("RATs") support multi-carrier based waveform. In NR Rel-15, multi-carrier based waveform (e.g., CP-OFDM) has been adopted for downlink ("DL") as well as for uplink ("UL") and additionally DFT-s-OFDM is also adopted for UL. However, CP-OFDM performance degrades at high frequencies (e.g., beyond 52.6 GHz) due to its sensitivity to phase noise and its high PAPR or cubic metric ("CM") that limits the cell coverage, edge of cell performance and higher power consumption. The above-mentioned problems make a single carrier waveform such as DFT-s-OFDM, a suitable candidate at high frequencies due to its natural robustness against phase noise and its low PAPR or CM.

Currently, standardization effort is on-going in Rel-17 to support NR operation from 52.6 GHz to 71 GHz. In the initial discussions, (i.e., before the start of NR Rel-17) many 3GPP member organizations proposed the use of new waveform such as DFT-s-OFDM waveform for DL due to its low PAPR comparing with CP-OFDM. However, it was decided to use CP-OFDM only for DL for 52.6 GHz to 71 GHz and consider mainly higher subcarrier spacing.

However, for potential standardization work in Rel-18 for beyond 71 GHz discussion of new waveform is expected to be restarted. Because NR already supports DFT-s-OFDM for UL, it is quite likely that it will be considered as one of the candidate waveforms for DL as well for NR beyond 71 GHz ("B71 GHz"). However, DFT-s-OFDM comes with restrictions in terms of multiplexing in frequency domain on a given time symbol and therefore, if DFT-s-OFDM is going to be applied for DL, one of the main challenges would be how to apply it for symbols that contain CSI-RS and whether CSI-RS needs coverage enhancement to overcome the PAPR/CM restriction of CP-OFDM. The PAPR of CP-OFDM used for CSI-RS transmission is high comparing with DFT-s-OFDM despite the fact that CSI-RS uses low modulation scheme (Quadrature Phase Shift Keying ("QPSK") modulation) since the PAPR of CP-OFDM does not highly depend on the modulation scheme.

Described herein are solutions for CSI-RS transmission in high frequencies, e.g., above between 52.6 GHz and 71 GHz and/or beyond 71 GHz. The solutions may be implemented by apparatus, systems, methods, or computer program products. Said solutions include signaling aspects to facilitate CSI-RS transmission/reception for DFT-s-OFDM by considering waveform multiplexing of CP-OFDM-based CSI-RS and DFT-s-OFDM-based PDSCH/PDCCH (physical downlink shared channel and/or physical downlink control channel), as well as Discrete Fourier Transforms ("DFTs") for CSI-RS multiplexing in time and/or frequency with DFT-s-OFDM.

One solution includes multiplexing DFT-s-OFDM-based Physical Downlink Shared Channel ("PDSCH") with CSI-RS symbols. Described herein is an indication to the UE of the indices and the number of Resource Blocks ("RBs") for DFT of PDSCH on the RBs that are not used for CSI-RS transmission on CSI-RS symbols. Described herein is an indication to the UE about the number of Resource Elements ("REs") for performed DFT between the CSI-RS REs.

Another solution includes time domain generation of CSI-RS and using DFT-s-OFDM for CSI-RS transmission. Described herein are configurations for CSI-RS to indicate the size, the number of DFTs used for CSI-RS. Described herein are length of the multiple DFTs performed for CSI-RS. Described herein are modification of CSI-RS table including: 1) Indication of more symbols for performing Time Domain Code Division Multiplexing ("TD-CDM"); and 2) Removing the frequency domain mapping for the case of RB-based DFT of CSI-RS. Another solution described an indication to the UE for switching between DFT-s-OFDM-based CSI-RS transmission and CP-OFDM based transmission.

FIG. 1 depicts a wireless communication system 100 for CSI-RS enhancement, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for CSI-RS enhancement apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

Communication devices, such as the remote unit 105 may be required to report radio channel conditions by measuring one or more CSI-RS transmitted by a base unit 121, generating a CSI report 127 and transmitting the CSI report 127 to the base unit 121. In various embodiments, the base unit 121 sends a CSI-RS configuration 125 to the remote unit 105 for performing and reporting CSI measurements, as described in further detail below.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for CSI-RS enhancement.

The solutions described herein deal with enhancing the coverage of CSI-RS transmission by reducing the PAPR. It is proposed that single DFT- or multiple DFT-based DFT-s-OFDM to be used for transmitting CSI-RS. Also disclosed are further enhancements related to multiplexing of CSI-RS ports in time and frequency and multiplexing of CSI-RS and other DL channels on same symbol are proposed. Additionally, some options are given for multiplexing DFT-s-OFDM-based PDSCH with CP-OFDM-based CSI-RS symbols to utilize the resources that are not used for CSI-RS. As used herein, the term "symbol" and/or "OFDM (Orthogonal Frequency Division Multiplexing) symbol" may refer to a unit of time, i.e., a symbol duration.

Beneficially, by single DFT- or multiple DFT-based DFT-s-OFDM to be used for transmitting CSI-RS, the system 100 is able to enhance the coverage of CSI-RS as well as giving better indication of the quality of the beam that will be used for data/control transmission if DFT-s-OFDM is used for PDSCH/PDCCH transmission.

Figure 2:
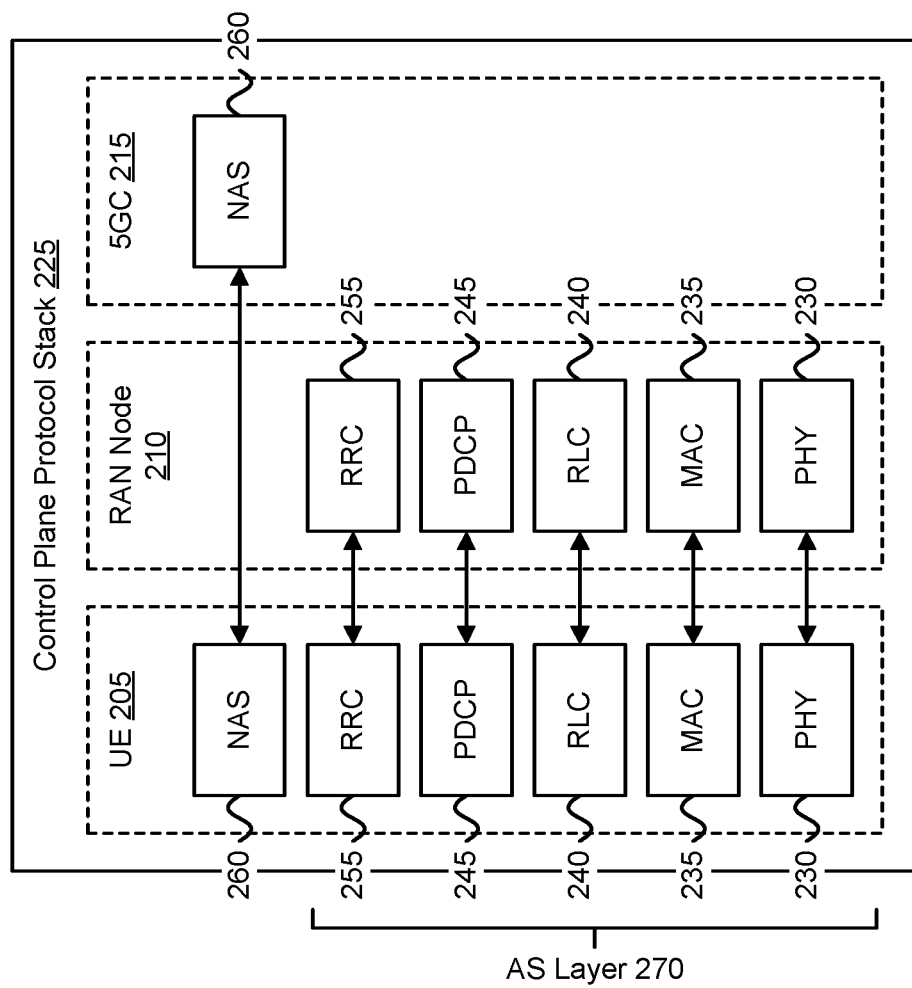
FIG. 2 is a diagram illustrating one embodiment of a 3GPP New Radio ("NR") protocol stack.
Figure 2:
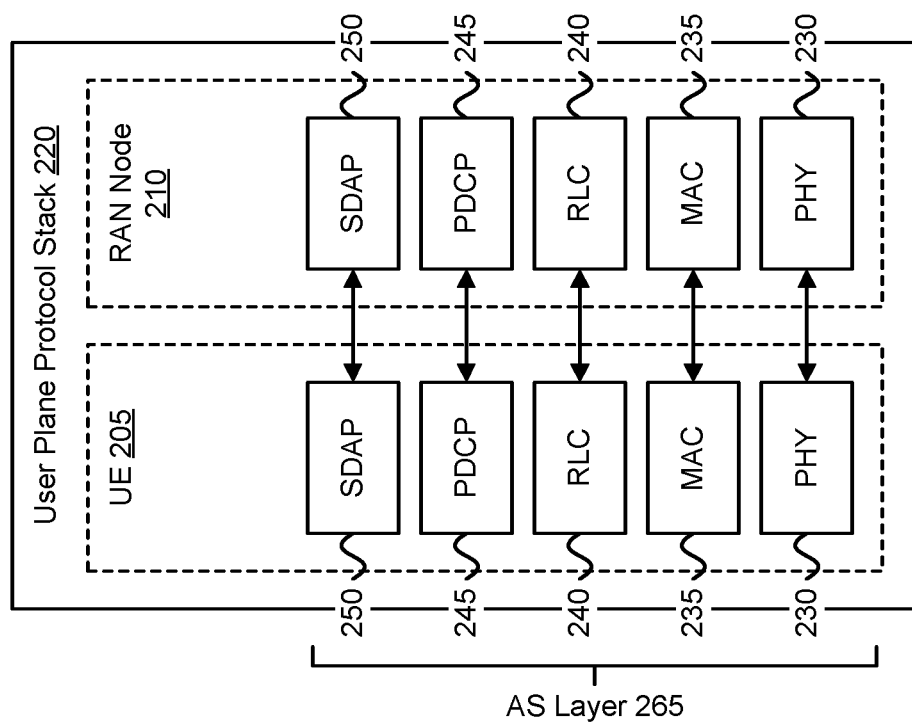

FIG. 2 depicts a NR protocol stack 200, according to embodiments of the disclosure. While FIG. 2 shows a UE 205, a RAN node 210 and a 5G core network ("5GC") 215, these are representative of a set of remote units 105 interacting with a base unit 121 and a mobile core network 140. As depicted, the protocol stack 200 comprises a User Plane protocol stack 220 and a Control Plane protocol stack 225. The User Plane protocol stack 220 includes a physical ("PHY") layer 230, a Medium Access Control ("MAC") sublayer 235, the Radio Link Control ("RLC") sublayer 240, a Packet Data Convergence Protocol ("PDCP") sublayer 245, and Service Data Adaptation Protocol ("SDAP") layer 250. The Control Plane protocol stack 225 includes a physical layer 230, a MAC sublayer 235, a RLC sublayer 240, and a PDCP sublayer 245. The Control Place protocol stack 225 also includes a Radio Resource Control ("RRC") layer 255 and a Non-Access Stratum ("NAS") layer 260.

The Access Stratum ("AS") layer 265 (also referred to as "AS protocol stack") for the User Plane protocol stack 220 consists of at least SDAP, PDCP, RLC and MAC sublayers, and the physical layer. The AS layer 270 for the Control Plane protocol stack 225 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 255 and the NAS layer 260 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 230 offers transport channels to the MAC sublayer 235. The MAC sublayer 235 offers logical channels to the RLC sublayer 240. The RLC sublayer 240 offers RLC channels to the PDCP sublayer 245. The PDCP sublayer 245 offers radio bearers to the SDAP sublayer 250 and/or RRC layer 255. The SDAP sublayer 250 offers QoS flows to the core network (e.g., 5GC 215). The RRC layer 255 provides for the addition, modification, and release of Carrier Aggregation and/or Dual Connectivity. The RRC layer 255 also manages the establishment, configuration, maintenance, and release of Signaling Radio Bearers ("SRBs") and Data Radio Bearers ("DRBs"). The NAS layer 260 is used to convey non-radio signaling between the UE 205 and, e.g., an AMF in the 5GC 215 (or an MME for an LTE/EPS scenario).

Regarding CSI-RS in NR, in general Zero-power ("ZP") and non-zero-power ("NZP") CSI-RS are defined. For a non-zero-power CSI-RS configured by the NZP-CSI-RS-Resource Information Element ("IE") or by the CSI-RS-Resource-Mobility field in the CSI-RS-ResourceConfigAlobility IE, the sequence shall be generated according to 3GPP TS 38.211, clause 7.4.1.5.2 and mapped to resource elements according to 3GPP TS 38.211, clause 7.4.1.5.3. For a zero-power CSI-RS configured by the ZP-CSI-RS-Resource IE, the UE 205 shall assume that the resource elements defined in clause 7.4.1.5.3 of 3GPP TS 38.211 are not used for PDSCH transmission subject to clause 5.1.4.2 of 3GPP TS 38.214. The UE 205 performs the same measurement/reception on channels/signals except PDSCH regardless of whether they collide with ZP CSI-RS or not.

Regarding Sequence generation for CSI-RS, the UE 205 is to assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2M + 1)) \quad \text{Equation 1}$$

where the pseudo-random sequence c(i) is defined in clause 5.2.1 of 3GPP TS 38.211.

The pseudo-random sequence generator shall be initialized with $$c_{init} = (2^{10}(N_{symb}^{slot} n_{s,f}^\mu + l + 1)(2n_{ID} + 1) + n_{ID}) \bmod 2^{31} \quad \text{Equation 2}$$

at the start of each OFDM symbol where $n_{s,f}^\mu$ is the slot number within a radio frame, l is the OFDM symbol number within a slot, and nm equals the higher-layer parameter scramblingID or sequenceGenerationConfig.

Regarding mapping to physical resources, for each CSI-RS configured, the UE 205 shall assume the sequence r(m) being mapped to resources elements $(k,l)_{p,\mu}$ according to $$a_{k,l}^{(p,\mu)} = \beta_{CSIRS} w_f(k') \cdot w_t(l') \cdot r_{l,n_{s,f}}(m') \quad \text{Equation 3}$$

$$m' = \lfloor n\alpha \rfloor + k' + \left\lfloor \frac{\overline{k}\rho}{N_{sc}^{RB}} \right\rfloor \quad \text{Equation 4}$$

$$k = nN_{sc}^{RB} + \overline{k} + k' \quad \text{Equation 5}$$

$$l = \overline{l} + l' \quad \text{Equation 6}$$

$$\alpha \begin{cases} \rho & \text{for } X = 1 \\ 2\rho & \text{for } X > 1 \end{cases} \quad \text{Equation 7}$$

$$n = 0, 1, \ldots \quad \text{Equation 8}$$

when the resource element $(k,l)_{p,\mu}$ is within the resource blocks occupied by the CSI-RS resource for which the UE 205 is configured.

The reference point for k=0 is subcarrier 0 in common resource block 0. The value of ρ is given by the higher-layer parameter density in the CSI-RS-ResourceMapping IE or the CSI-RS-CellMobility IE and the number of ports X is given by the higher-layer parameter nrofPorts.

The UE 205 is not expected to receive CSI-RS and Demodulation Reference Signal ("DMRS") on the same resource elements. The UE 205 shall assume $\beta_{CSIRS} > 0$ for a non-zero-power CSI-RS where $\beta_{CSIRS}$ is selected such that the power offset specified by the higher-layer parameter powerControlOffsetSS in the NZP-CSI-RS-Resource IE, if provided, is fulfilled.

The quantities k', l', $w_f(k')$, and $w_t(l')$ are given by Tables 1 to 5 (sourced from 3GPP TS 38.211, Section 7.4.1.5.3)

where each $(\bar{k},\bar{l})$ in a given row of Table 1 corresponds to a Code Division Multiplexing ("CDM") group of size 1 (no CDM) or size 2, 4, or 8. The CDM type is provided by the higher layer parameter cdm-Type in the CSI-RS-ResourceMapping IE. The indices k' and l' index resource elements within a CDM group.

The time-domain locations $l_0 \in \{0, 1, \ldots, 13\}$ and $l_1 \in \{2, 3, \ldots, 12\}$ are provided by the higher-layer parameters firstOFDMSymbolInTimeDomain and firstOFDMSymbolInTimeDomain2, respectively, in the CSI-RS-ResourceMapping IE or the CSI-RS-ResourceConfigMobility IE and defined relative to the start of a slot.

The frequency-domain location is given by a bitmap provided by the higher-layer parameter frequencyDomainAllocation in the CSI-RS-ResourceMapping IE or the CSI-RS-ResourceConfigMobdity IE with the bitmap and value of $k_i$ in Table 1 given by:

- $[b_3 \ldots b_0]$, $k_{i-1} = f(i)$ for row 1 of Table 1
- $[b_{11} \ldots b_0]$, $k_{i-1} = f(i)$ for row 2 of Table 1
- $[b_2 \ldots b_0]$, $k_{i-1} = f(i)$ for row 4 of Table 1
- $[b_5 \ldots b_0]$, $k_{i-1} = f(i)$ for all other cases where f(i) is the bit number of the bit in the bitmap set to one, repeated across every $[1/\rho]$ of the resource blocks configured for CSI-RS reception by the UE 205. The starting position and number of the resource blocks in which the UE 205 shall assume that CSI-RS is transmitted are given by the higher-layer parameters freqBand and density in the CSI-RS-ResourceMapping IE for the bandwidth part given by the higher-layer parameter BWP-Id in the CSI-ResourceConfig IE or given by the higher-layer parameters nroJPRBs in the CSI-RS-CellMobility IE where the parameter startPRB given by csi-rs-MeasurementBW is relative to common resource block 0.

The UE 205 shall assume that a CSI-RS is transmitted using antenna ports p numbered according to $$p = 3000 + s + jL \quad \text{Equation 9}$$

$$j = 0, 1, \ldots, N/L - 1 \quad \text{Equation 10}$$

$$s = 0, 1, \ldots, L - 1 \quad \text{Equation 11}$$

where s is the sequence index provided by Tables 2-5, $L \in \{1, 2, 4, 8\}$ is the CDM group size, and N is the number of CSI-RS ports.

The CDM group index j given in Table 1 corresponds to the time/frequency locations $(\bar{k},\bar{l})$ for a given row of the table. The CDM groups are numbered in order of increasing frequency domain allocation first and then increasing time domain allocation. For a CSI-RS resource configured as periodic or semi-persistent by the higher-layer parameter resourceType or configured by the higher-layer parameter CSI-RS-CellMobility, the UE shall assume that the CSI-RS is transmitted in slots satisfying $$(N_{slot}^{frame,\mu} n_f + n_{s,f}^\mu - T_{offset}) \bmod T_{CSI-RS} = 0 \quad \text{Equation 12}$$

where the periodicity $T_{CSI-RS}$ (in slots) and slot offset $T_{offset}$ are obtained from the higher-layer parameter CSI-ResourcePeriodicityAndOffset or slotConfig. The UE 205 shall assume that CSI-RS is transmitted in a candidate slot as described in clause 11.1 of 3GPP TS 38.213.

The UE 205 may assume that antenna ports within a CSI-RS resource are quasi co-located with Quasi-Co-Location ("QCL") Type-A, Type-D (when applicable), and average gain.

TABLE 1

| | | | | | | | |
|---|---|---|---|---|---|---|---|
| | | | | CSI-RS locations within a slot. | | | |
| Row | Ports X | Density ρ | cdm-Type | $(\bar{k},\bar{l})$ | CDM group index $j$ | k' | l' |
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0)$, | 0 | 0 | 0 |
| 3 | 2 | 1, 0.5 | fd-CDM2 | $(k_0, l_0)$, | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |

TABLE 1-continued

CSI-RS locations within a slot.

| Row | Ports X | Density ρ | cdm-Type | ($\bar{k}$, $\bar{l}$) | CDM group index $j$ | k' | l' |
|---|---|---|---|---|---|---|---|
| 16 | 32 | 1, 0.5 | fd-CDM2 | ($k_0$, $l_0$), ($k_1$, $l_0$), ($k_2$, $l_0$), ($k_3$, $l_0$), ($k_0$, $l_0$ + 1), ($k_1$, $l_0$ + 1), ($k_2$, $l_0$ + 1), ($k_3$, $l_0$ + 1), ($k_0$, $l_1$), ($k_1$, $l_1$), ($k_2$, $l_1$), ($k_3$, $l_1$), ($k_0$, $l_1$ + 1), ($k_1$, $l_1$ + 1), ($k_2$, $l_1$ + 1), ($k_3$, $l_1$ + 1) | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | ($k_0$, $l_0$), ($k_1$, $l_0$), ($k_2$, $l_0$), ($k_3$, $l_0$), ($k_0$, $l_1$), ($k_1$, $l_1$), ($k_2$, $l_1$), ($k_3$, $l_1$) | 0, 1, 2, 3, 4, 5, 6, 7 | 0, 1 | 0, 1 |
| 18 | 32 | 1, 0.5 | cdm8-FD2-TD4 | ($k_0$, $l_0$), ($k_1$, $l_0$), ($k_2$, $l_0$), ($k_3$, $l_0$) | 0, 1, 2, 3 | 0, 1 | 0, 1, 2, 3 |

TABLE 2

The sequences $w_f(k')$ and $w_t(l')$ for cdm-Type equal to 'noCDM'.

| Index | $w_f(0)$ | $w_t(0)$ |
|---|---|---|
| 0 | 1 | 1 |

TABLE 3

The sequences $w_f(k')$ and $w_t(l')$ for cdm-Type equal to 'fd-CDM2'.

| Index | [$w_f(0)$ $w_f(1)$] | $w_t(0)$ |
|---|---|---|
| 0 | [+1 +1] | 1 |
| 1 | [+1 −1] | 1 |

TABLE 4

The sequences $w_f(k')$ and $w_t(l')$ for cdm-Type equal to 'cdm4-FD2-TD2'.

| Index | [$w_f(0)$ $w_f(1)$] | [$w_t(0)$ $w_t(1)$] |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 5

The sequences $w_f(k')$ and $w_t(l')$ for cdm-Type equal to 'cdm8-FD2-TD4'.

| Index | [$w_f(0)$ $w_f(1)$] | [$w_t(0)$ $w_t(1)$ $w_t(2)$ $w_t(3)$] |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 3A:
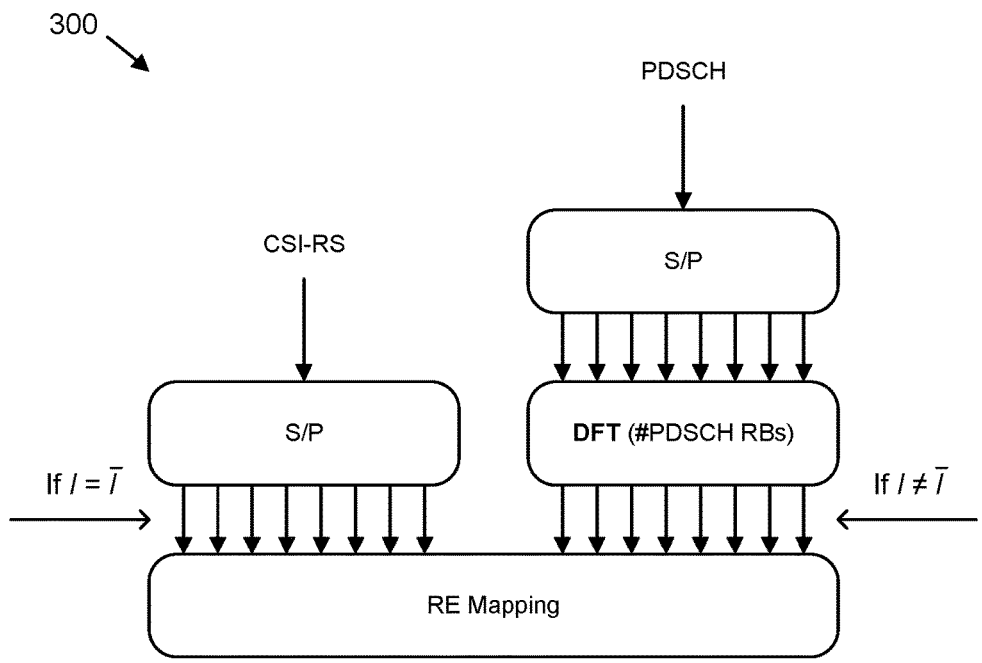
FIG. 3A is a diagram illustrating one embodiment of a transceiver for DFT-s-OFDM-based PDSCH and CP-OFDM-based CSI-RS.

FIG. 3A depicts an exemplary transmitter 300 for DFT-s-OFDM-based PDSCH and CP-OFDM-based CSI-RS, according to embodiments of a first solution of the disclosure. As depicted, the PDSCH (i.e., containing user-plane data) is converted to parallel data (e.g., via serial-to-parallel ("S/P") converter) and discrete Fourier transform ("DFT") with a configured size is applied to the parallel output. The DFT output sequence is then mapped to Resource Elements ("REs") for generating the OFDM signal. Concurrently, a CSI-RS is converted to parallel sequences (e.g., via S/P converter), which output is then then mapped to Resource Elements ("REs") for generating the OFDM signal. While FIG. 3A shows DFT-s-OFDM-based PDSCH, in other embodiments the transmitter 300 may receive a PDCCH signal for generating the DFT-s-OFDM waveform.

Figure 3B:
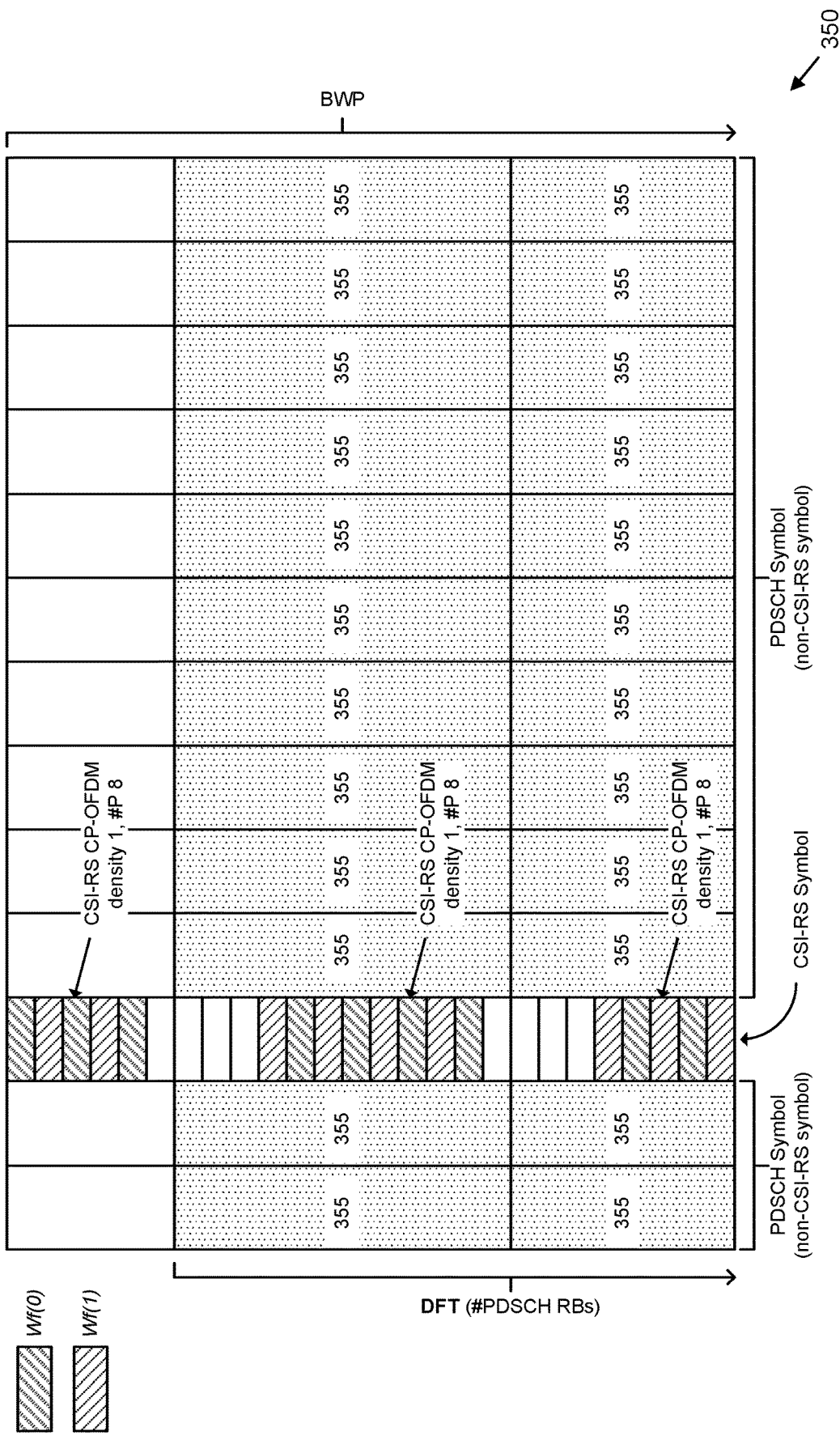
FIG. 3B is a diagram illustrating one embodiment of DFT-s-OFDM-based PDSCH multiplexed with CSI-RS with no overlapped symbols.

FIG. 3B depicts a resource grid 350 with DFT-s-OFDM-based PDSCH multiplexed with CSI-RS with no overlapped symbols, according to embodiments of the first solution. In the first solution, a DFT-s-OFDM waveform is used for PDSCH 355 (alternatively, PDCCH) with the DFT size equal to the number of configured RBs in the symbols where CSI-RS are not present, while CSI-RS are inserted in frequency domain and a CP-OFDM waveform is used for CSI-RS symbols, as is shown in FIG. 3B. A first set of REs in the CSI-RS symbol corresponds to a CSI-RS for a first port (i.e., Wf(0)) and a second set of REs in the CSI-RS symbol corresponds to a CSI-RS for a second port (i.e., Wf(1)). Note that the location (in time and/or frequency) and waveform type for CSI-RS may be configured by the network (e.g., RAN node 210) via RRC-CSI-RS-ResourceSet.

In some embodiments of the first solution, PDSCH and CSI-RS may be multiplexed into the same symbol. In such embodiments, the UE 205 may be configured with a second DFT for the PDSCH parts that are to be multiplexed with CSI-RS in the same symbol, e.g., via RRC-CSI-RS-ResourceSet. While not shown in FIGS. 3A-3B it is assumed that the UE 205 contains a receiver complementary to the transmitter 300 and which will perform the inverse operation of the transmitter 300.

Figure 4A:
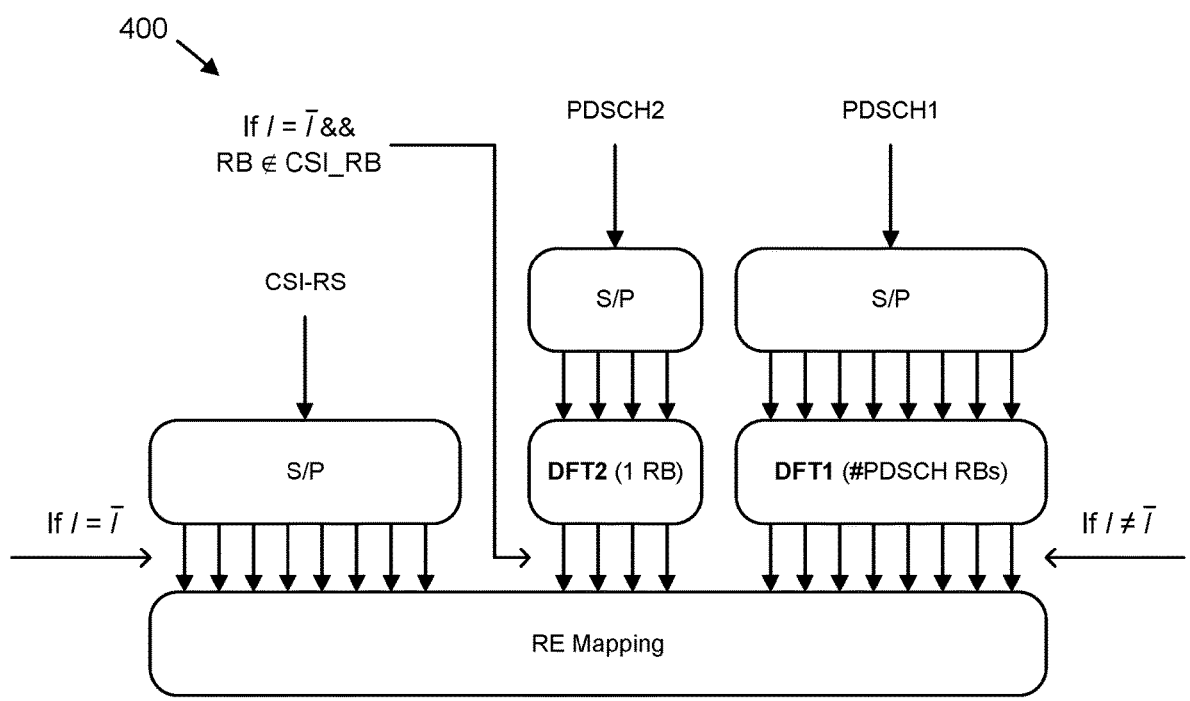
FIG. 4A is a diagram illustrating another embodiment of a transceiver for DFT-s-OFDM-based PDSCH and CP-OFDM-based CSI-RS.

FIG. 4A depicts an exemplary transmitter 400 for DFT-s-OFDM-based PDSCH and CP-OFDM-based CSI-RS, according to embodiments of the first solution. As depicted, the PDSCH (i.e., containing user-plane data) is converted to parallel data (e.g., via serial-to-parallel ("S/P") converter). A first part of the PDSCH (depicted as "PDSCH1") is to be mapped to non-CSI-RS symbols and a first discrete Fourier transform (depicted as "DFT1") with a configured size is applied to the PDSCH1 parallel output. A second part of the PDSCH (depicted as "PDSCH2") is to be mapped to CSI-RS symbols and a second discrete Fourier transform (depicted as "DFT2") with a configured size is applied to the PDSCH1 parallel output. The DFT output sequences are then mapped to Resource Elements ("REs") for generating the OFDM signal.

Concurrently, a CSI-RS is converted to parallel sequences (e.g., via S/P converter), which output is then then mapped to Resource Elements ("REs") for generating the OFDM signal. While FIG. 4A shows DFT-s-OFDM-based PDSCH, in other embodiments the transmitter 400 may receive a PDCCH signal for generating the DFT-s-OFDM waveform. Here, the PDCCH signal would be split into two parts: one part to be mapped to non-CSI-RS symbols and a second part to be mapped to a CSI-RS symbol.

FIG. 4B depicts a resource grid 450 with one embodiment of DFT-s-OFDM-based PDSCH multiplexed with CSI-RS on a same symbol, according to embodiments of the first solution. The UE 205 is indicated via RRC or Downlink Control Information ("DCI") with the number of Resource Blocks ("RBs") and/or DFT length for PDSCH with DFT-s-OFDM 455 mapped on non-CSI-RS symbols. The UE 205 is indicated with another DFT with size of 1 RB or more for PDSCH with DFT-s-OFDM 460 that is multiplexed with CSI-RS in the same symbols as depicted in FIG. 4B. While not shown in FIGS. 4A-4B it is assumed that the UE 205 contains a receiver complementary to the transmitter 400 and which will perform the inverse operation of the transmitter 400.

In various embodiments, the UE 205 may be configured with CSI-RS resource set configuration and indicated to use part of the configured symbols used for CSI-RS for PDSCH. In one embodiment, the UE 205 is indicated with the RE mapping of PDSCH on the CSI-RS symbol(s). In another embodiment, the UE 205 is indicated with the RB indices for PDSCH on the CSI-RS symbols.

In some embodiments, the multiplexing PDSCH and CSI-RS in the same symbol is configured by the network and may rely on the following conditions: A) the configured CSI-RS density allows for RBs with no CSI-RS, for example when the density is 0.5; and B) the QCL between CSI-RS and DMRS for PDSCH is assumed, i.e., both CSI-RS and PDSCH beams are in close directions.

The UE 205 is indicated with the RB indices and the DFT length (i.e., DFT2 length) for contiguous RBs if no CSI-RS are configured for these RBs. The UE 205 is expected to receive PDSCH on these RBs if l=$\bar{l}$ and if RB∉CSI_RB, where $\bar{l}$ is CSI-RS symbols and CSI_RB is the RB index used for CSI-RS mapping. In another implementation, the DFT length (i.e., DFT2 length) of PDSCH part is based on the number of REs between the CSI-RS REs if l=$\bar{l}$ and if RE∉CSI_RE, where CSI_RE is the REs used for CSI-RS. The other part of PDSCH with DFT length (i.e., DFT1 length) equal to the number of PDSCH RBs is mapped on l≠$\bar{l}$.

In some embodiments, CSI-RS and other DL channels in same symbol (including same or different RBs) is expected to be configured and received by UE 205 only when the QCL type-D assumption (i.e., beam) is same for both the CSI-RS resources mapped to that symbol and the DL channel. In other embodiments, different QCL type-D assumption (i.e., beam) is applied to CSI-RS resource on a symbol and other DL channel, only when there is a minimum configured frequency gap between the frequency resources for CSI-RS and DL channel.

In an alternative implementation of the first solution, DFT-s-OFDM-based PDSCH is multiplexed with Channel State Information for Interference Measurement ("CSI-IM") in the same symbol. Here, the UE 205 may be configured with number of RBs and the DFT lengths for the mapped PDSCH between the CSI-IM resources in the same symbol.

Figure 5A:
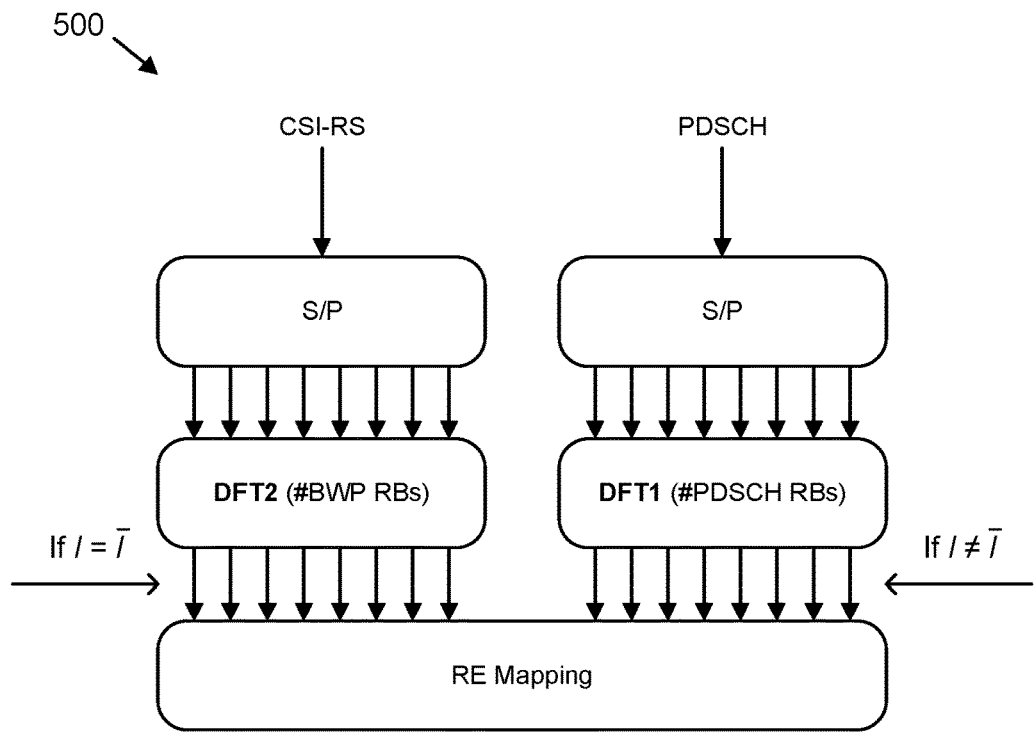
FIG. 5A is a diagram illustrating one embodiment of a transceiver for DFT-s-OFDM-based PDSCH and DFT-s-OFDM-based CSI-RS.

FIG. 5A depicts an exemplary transmitter 500 for DFT-s-OFDM-based PDSCH and DFT-s-OFDM-based CSI-RS, according to embodiments of a second solution of the disclosure. As depicted, the PDSCH (i.e., containing user-plane data) is converted to parallel data (e.g., via serial-to-parallel ("S/P") converter) and a first discrete Fourier transform (depicted as "DFT1") with a configured size is applied to the parallel output. The DFT1 output sequence is then mapped to Resource Elements ("REs") for generating the OFDM signal.

Concurrently, CSI-RS is converted to parallel sequences (e.g., via S/P converter) and a second discrete Fourier transform (depicted as "DFT2") with a configured size is applied to the parallel output. The DFT2 output sequence is then mapped to Resource Elements ("REs") for generating the OFDM signal. While FIG. 5A shows DFT-s-OFDM-based PDSCH, in other embodiments the transmitter 500 may receive a PDCCH signal for generating the DFT-s-OFDM waveform.

Figure 5B:
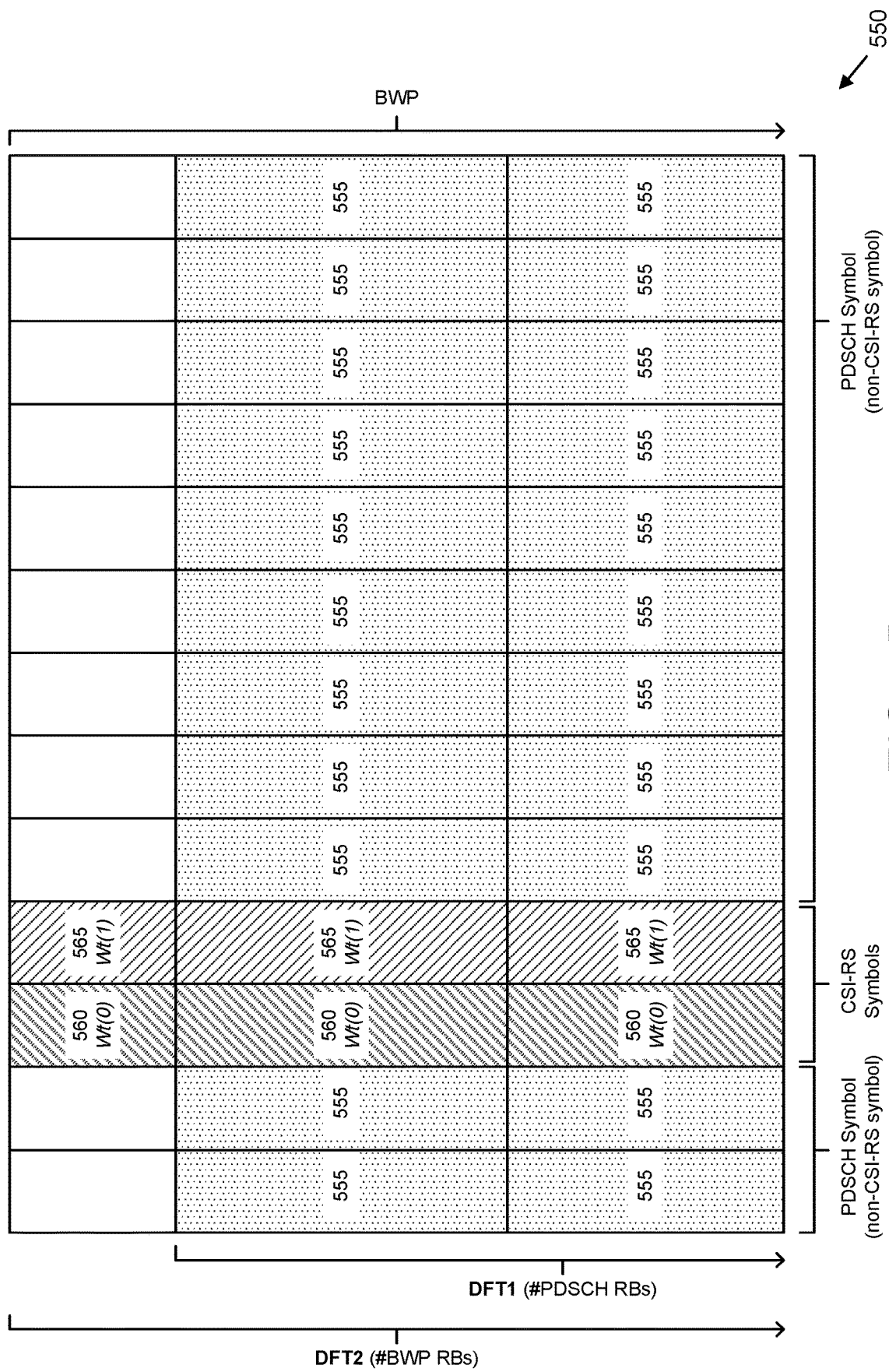
FIG. 5B is a diagram illustrating one embodiment of DFT-s-OFDM-based PDSCH multiplexed with DFT-s-OFDM-based CSI-RS.

FIG. 5B depicts a resource grid 550 with one embodiment of DFT-s-OFDM-based PDSCH 555 multiplexed with DFT-s-OFDM-based CSI-RS, according to embodiments of the second solution. In the second solution, in order to reduce the PAPR/CM of CSI-RS symbols, DFT-s-OFDM is used for transmitting CSI-RS in the DL by generating the CSI-RS in time domain and performing DFT with a configured size before Inverse Fast Fourier Transformation ("IFFT"), as illustrated in FIG. 5A and FIG. 5B, in the case of 2 ports. A first CSI-RS symbol corresponds to a CSI-RS 560 for a first port (i.e., Wt(0)) and a second CSI-RS symbol corresponds to a CSI-RS 565 for a second port (i.e., Wt(1)). While not shown in FIGS. 5A-5B it is assumed that the UE 205 contains a receiver complementary to the transmitter 500 and which will perform the inverse operation of the transmitter 500.

The UE 205 is configured by the network with CSI-RS resource set parameters that indicates the length, the number of ports (i.e., using parameter nrofPorts) and the symbols for CSI-RS. In one implementation of the second solution, the UE 205 is configured with the required parameters for CSI-RS positions and number of ports. In another implementation of the second solution, an index for RE mapping table is signaled to the UE 205 via RRC configuration for periodic or semi-persistent CSI-RS resources or via DCI for aperiodic CSI-RS. In the second solution, the CSI measurement still can be performed in frequency domain on the length of the DFT.

Using DFT-s-OFDM limits the number of supported ports. However, to allow for more ports, TD-CDM can be performed on a greater number of symbols to compensate for the reduction of supported ports in frequency. The Table 1 (above) can be modified to allow for more TD-CDM performed in multiple symbols depending on the number of ports, as depicted below in Table 6. The frequency indexes of mapping REs can be modified to cover the 12 sub-carriers for each RB. In another implementation, no entries needed for k and only the number of CSI-RS RBs and the starting RB is indicated in RRC-SI-RS-ResourceSet.

TABLE 6

CSI-RS locations within a slot when DFT-s-OFDM is applied for CSI-RS.

| Row | Ports X | Density (ρ) | cdm-Type | $(\bar{k}, \bar{l})$ | CDM group index j | k' | l' |
|---|---|---|---|---|---|---|---|
| 1 | 1 | — | noCDM | $(k_0, l_0), (k_0 + 1, l_0), (k_0 + 2, l_0), \ldots (k_0 + 11, l_0)$ Alt., only $\bar{l}$ is indicated and $\bar{k}$ is calculated from the nofRBs and startingRB parameters | 0 | 0 | 0 |
| 2 | 2 | — | td-CDM2 | $(k_0, l_0), (k_0 + 1, l_0), (k_0 + 2, l_0), \ldots (k_0 + 11, l_0),$ $(k_0, l_0 + 1), (k_0 + 1, l_0 + 1),$ $(k_0 + 2, l_0 + 1), \ldots (k_0 + 11, l_0 +1)$ Alt., only $\bar{l}$ is indicated and $\bar{k}$ is calculated from the nofRBs and startingRB parameters | 0, 1 | 0 | 0, 1 |
| 3 | 4 | — | td-CDM4 | $(k_0, l_0), (k_0 + 1, l_0), (k_0 + 2, l_0), \ldots (k_0 + 11, l_0),$ $(k_0, l_0 + 1), (k_0 + 1, l_0 + 1),$ $(k_0 + 2, l_0 + 1), \ldots (k_0 + 11, l_0 +1)$ $(k_0, l_0 + 2), (k_0 + 1, l_0 + 2),$ $(k_0 + 2, l_0 + 2), \ldots (k_0 + 11, l_0 + 1)$ $(k_0, l_0 + 3), (k_0 + 1, l_0 + 3),$ $(k_0 + 2, l_0 + 3), \ldots (k_0 + 11, l_0 + 3)$ Alt., only $\bar{l}$ is indicated and $\bar{k}$ is calculated from the nofRBs and startingRB parameters | 0, 1, 2, 3 | 0 | 0, 1, 2, 3 |
| 4 | | | | | | | |

In further implementations, the density in the Table 4 can be modified as the distance between the RBs used for CSI-RS instead of the number of REs in an RB, since in a single RB all REs are used for CSI-RS.

In some embodiments of the second solution, the UE 205 is indicated with waveform switching with the parameter waveformType. The waveform used for CSI-RS is either CP-OFDM (with CSI-RS mapping in frequency domain) or DFT-s-OFDM (with CSI-RS generation in the time domain and with performing DFT prior to IFFT). The parameter waveformType is indicated either via high layer RRC/MAC-CE or dynamically indicated using DCI.

In one implementation of the second solution, the network (i.e., RAN node 210) decides the waveform based on the frequency band and/or the configured sub-carrier spacing ("SCS"). In another implementation the network relies on the UE 205 feedback of CSI-RS Resource Index Reference Signal Received Power ("CRI-RSRP") of different beams. Upon receiving CRI-RSRP from the UE 205 with values below a certain threshold, the RAN node 210 switches to a low PAPR CSI-RS transmission.

In an alternative embodiment of the second solution, DFT-s-OFDM is used for transmitting Channel State Information for Interference Measurement ("CSI-IM"). The UE 205 is configured with CSI-IM resources in time and frequency that include number of Resource Elements ("REs") for DFT, the location of the DFT, and number of ports for CSI-IM.

Figure 6A:
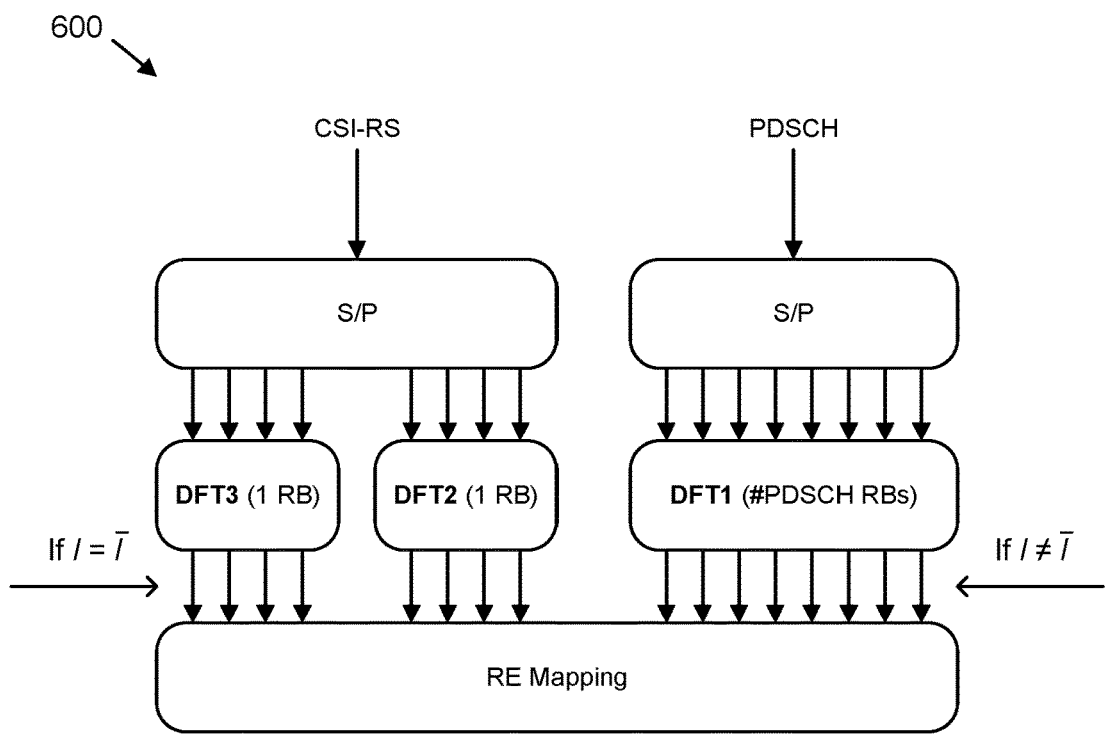
FIG. 6A is a diagram illustrating another embodiment of a transceiver for DFT-s-OFDM-based PDSCH and DFT-s-OFDM-based CSI-RS.

FIG. 6A depicts an exemplary transmitter 600 for DFT-s-OFDM-based PDSCH and DFT-s-OFDM-based CSI-RS, according to embodiments of a third solution of the disclosure. As depicted, the PDSCH (i.e., containing user-plane data) is converted to parallel data (e.g., via serial-to-parallel ("S/P") converter) and a first discrete Fourier transform (depicted as "DFT1") with a configured size is applied to the parallel output. The DFT1 output sequence is then mapped to Resource Elements ("REs") for generating the OFDM signal.

Concurrently, CSI-RS is converted to parallel sequences (e.g., via S/P converter). A second discrete Fourier transform (depicted as "DFT2") with a configured size is applied to a first CSI-RS and a third discrete Fourier transform (depicted as "DFT3") with a configured size is applied to a second CSI-RS. The DFT output sequences are then mapped to Resource Elements ("REs") for generating the OFDM signal. While FIG. 6A shows DFT-s-OFDM-based PDSCH, in other embodiments the transmitter 600 may receive a PDCCH signal for generating the DFT-s-OFDM waveform.

Figure 6B:
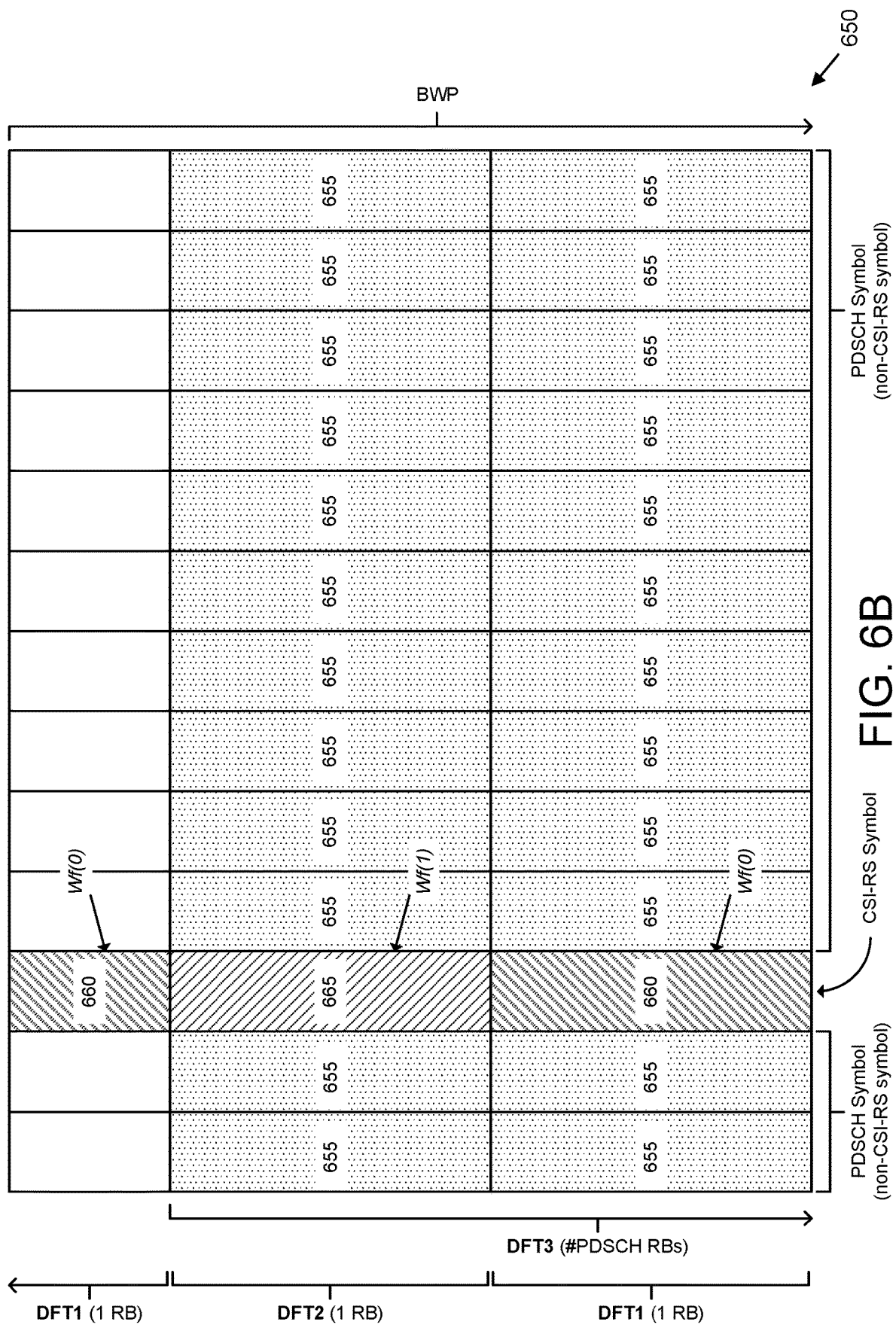
FIG. 6B is a diagram illustrating another embodiment of DFT-s-OFDM-based PDSCH multiplexed with DFT-s-OFDM-based CSI-RS.

FIG. 6B depicts a resource grid 650 with multi-DFT for DFT-s-OFDM-based CSI-RS multiplexed with DFT-s-OFDM-based PDSCH, according to embodiments of a third solution. According to the third solution, DFT-s-OFDM is proposed for transmitting CSI-RS in the DL by generating the CSI-RS in time domain and performing DFT with a configured size before IFFT. The UE 205 is configured by the network (e.g., RAN node 210) with CSI-RS resource set parameters that indicate the length, the number of ports nrofPorts and the symbols for CSI-RS. The UE 205 is configured with multiple DFT lengths to support more ports with Frequency Domain Code Division Multiplexing ("FD-CDM") in frequency domain with a compromising of the total PAPR as shown in FIG. 6A and FIG. 6B. The first CSI-RS DFT with size of 1 RB corresponds to a CSI-RS 660 for a first port (i.e., Wf(0)) and a second CSI-RS DFT with size of 1 RB corresponds to a CSI-RS 665 for a second port (i.e., Wf(1)). While not shown in FIGS. 6A-6B it is assumed that the UE 205 contains a receiver complementary to the transmitter 600 and which will perform the inverse operation of the transmitter 600.

In one implementation the size of each DFT is 1 RB and FD-CDM is performed in RB based. In another implementation more than 1 RB is configured for the DFT. The length of the DFT/number of RBs depends on the required number of ports and the size of the Bandwidth Part ("BWP"). In one implementation the UE 205 is configured with the required parameters for CSI-RS positions and number of ports nrof-Ports. In another implementation an index for RE mapping table is signaled to the UE 205 via RRC configuration for periodic or semi-persistent CSI-RS resources or via DCI for aperiodic CSI-RS.

In another embodiment, depending on the CSI-RS density (in terms of RBs/DFT blocks) and number of ports, PDSCH is multiplexed with DFT-s-OFDM-based CSI-RS in the same symbols. The UE 205 is configured with the number of RBs and the DFT lengths for PDSCH parts mapped between CSI-RS blocks.

Figure 7:
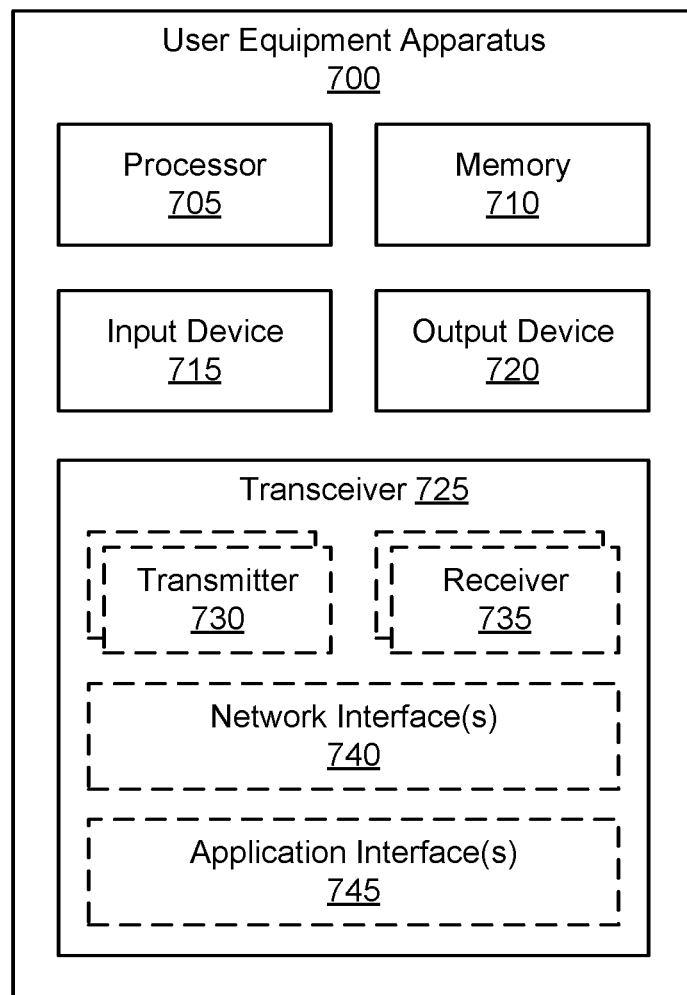
FIG. 7 is a block diagram illustrating one embodiment of a user equipment apparatus that may be used for CSI-RS enhancement.

FIG. 7 depicts a user equipment apparatus 700 that may be used with CSI-RS enhancement, according to embodiments of the disclosure. In various embodiments, the user equipment apparatus 700 is used to implement one or more of the solutions described above. The user equipment apparatus 700 may be one embodiment of the remote unit 105, the UE 205, and/or the user equipment apparatus 700, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 receives a first configuration, i.e., via the transceiver 725 and from a network entity (e.g., a gNB). Here, the first configuration includes one or more of: A) a configuration of indices and a length of at least one first DFT for mapping on CSI-RS symbols, and B) a configuration of a number and a length of at least one second DFT for CSI-RS transmission. Via the transceiver 725, the processor 705 receives a CSI-RS transmission and a PDSCH transmission during a symbol by applying multiple DFTs based on the first configuration. The processor 705 further generates a CSI report based on the received CSI-RS transmission and transmits the generated CSI report to a network entity, i.e., via the transceiver 725.

In further embodiments, the first configuration includes an indication of a waveform type for CSI-RS transmission. In some embodiments, the CSI-RS transmission uses a CP-OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the processor 705 further receives a CSI-RS resource set configuration and an indication to use part of the configured time-domain symbols used for CSI-RS for PDSCH transmission (i.e., to multiplex PDSCH and CSI-RS in the same symbol). In one embodiment, the processor 705 further receives an indication of a RE mapping of PDSCH on CSI-RS symbols. In another embodiment, the processor 705 further receives an indication of RB indices for PDSCH on CSI-RS symbols.

In some embodiments, the processor 705 further receives both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the processor 705 further applies a first QCL t e-D assumption (i.e., beam) to CSI-RS resource on a symbol and applying a different (i.e., second) QCL type-D assumption to another downlink channel when there is a minimum configured frequency gap between frequency resources for CSI-RS transmission and frequency resources for transmission of the downlink channel.

In some embodiments, the processor 705 further receives a CSI-RS resource set configuration with parameters that indicate one or more of: a DFT length performed for CSI-RS, a number of CSI-RS ports (e.g., parameter nrof-Ports), and/or symbol indices for CSI-RS. In some embodiments, the processor 705 further receives a configuration with an index for RE mapping table via RRC configuration for periodic or semi-persistent CSI-RS resources. In other embodiments, the processor 705 further receives a configuration with an index for RE mapping table via DCI for aperiodic CSI-RS.

In some embodiments, the first configuration includes multiple second DFT for CSI-RS and contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to CSI-RS enhancement and/or mobile operation. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
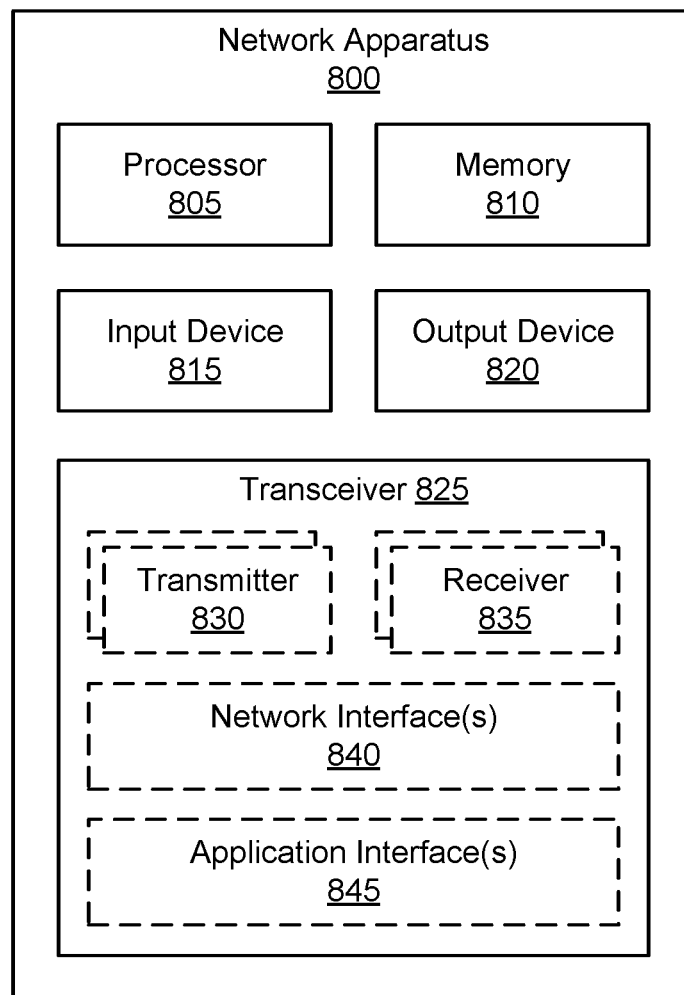
FIG. 8 is a block diagram illustrating one embodiment of a network apparatus that may be used for CSI-RS enhancement.

FIG. 8 depicts a network apparatus 800 that may be used with CSI-RS enhancement, according to embodiments of the disclosure. In one embodiment, network apparatus 800 may be one implementation of a RAN device, such as the base unit 121, as described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, via the transceiver 825 the processor 805 transmits a first configuration to a communication device (i.e., to a UE), where the first configuration includes one or more of: A) a configuration of indices and a length of at least one first DFT for mapping PDSCH on CSI-RS symbols, and B) a configuration of a number and a length of at least one DFT for CSI-RS transmission. Via the transceiver 825, the processor 805 transmits a CSI-RS transmission and a PDSCH transmission during a symbol by applying multiple DFTs based on the first configuration and receives, from the communication device, a CSI report based on the transmitted CSI-RS.

In further embodiments, the first configuration includes an indication of a waveform type for CSI-RS transmission. In some embodiments, the CSI-RS transmission uses a CP-OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the processor 805 sends, to the UE, a CSI-RS resource set configuration and an indication to use part of the configured time-domain symbols used for CSI-RS for PDSCH transmission (i.e., to multiplex PDSCH and CSI-RS in the same symbol). In one embodiment, the transceiver 825 further transmits, to the UE, an indication of a RE mapping of PDSCH on CSI-RS symbols. In another embodiment, the transceiver 825 further transmits, to the UE, an indication of RB indices for PDSCH on CSI-RS symbols.

In some embodiments, the transceiver 825 further transmits, to the UE, both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the transceiver 825 further applies a first QCL t e-D assumption (i.e., beam) to CSI-RS resource on a symbol and applying a different (i.e., second) QCL type-D assumption to another downlink channel when there is a minimum configured frequency gap between frequency resources for CSI-RS transmission and frequency resources for transmission of the downlink channel.

In some embodiments, the processor 805 further sends, to the UE, a CSI-RS resource set configuration with parameters that indicate one or more of: a DFT length performed for CSI-RS, a number of CSI-RS ports (i.e., parameter nrof-Ports), and/or symbol indices for CSI-RS. In some embodiments, the processor 805 further sends, to the UE, a configuration with an index for RE mapping table via RRC configuration for periodic or semi-persistent CSI-RS resources.

In some embodiments, the processor 805 further sends, to the UE, a configuration with an index for RE mapping table via DCI for aperiodic CSI-RS. In some embodiments, the first configuration further includes multiple second DFT for CSI-RS, wherein the first configuration contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to CSI-RS enhancement and/or mobile operation. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the Public Land Mobile Network ("PLMN") and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
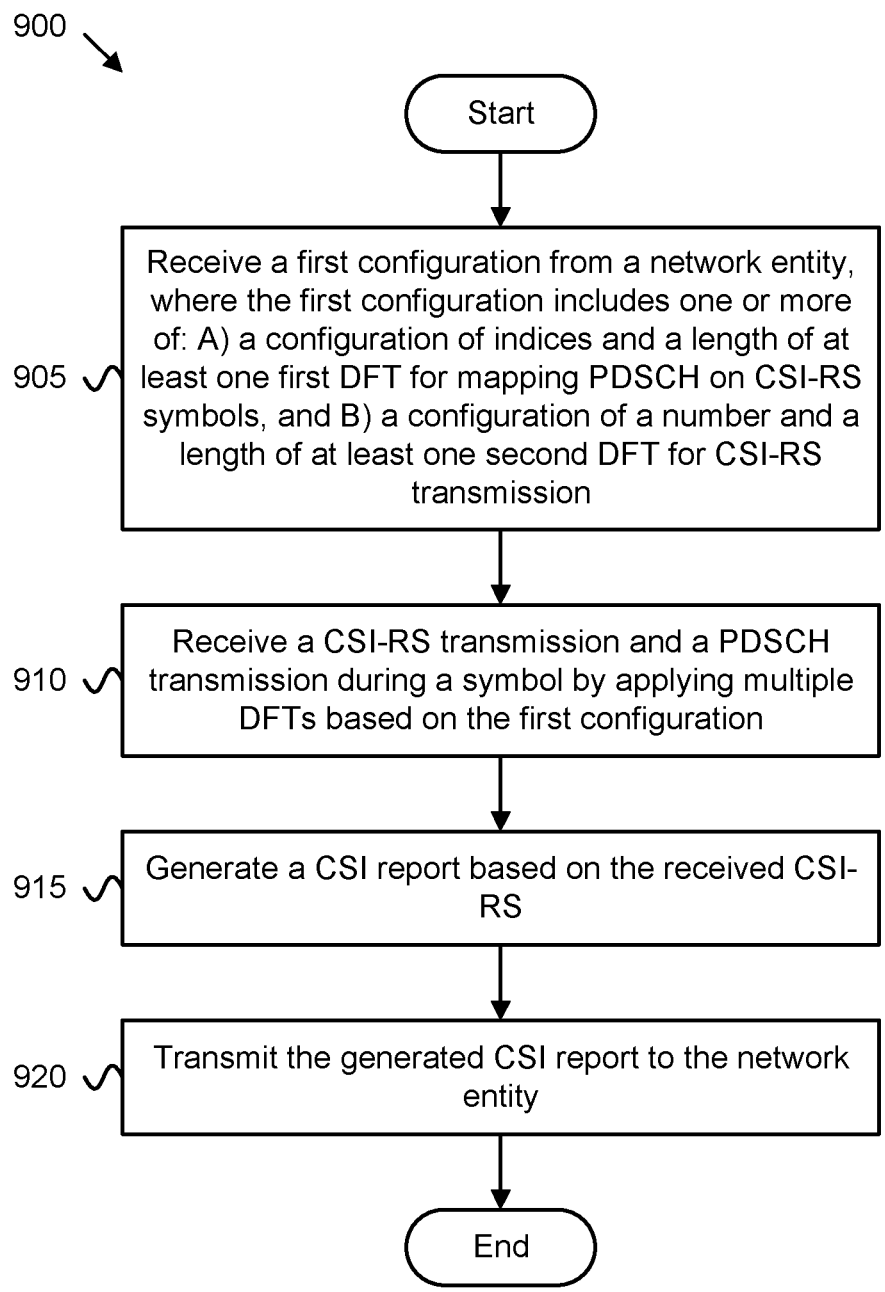
FIG. 9 is a flowchart diagram illustrating one embodiment of a first method for CSI-RS enhancement.

FIG. 9 depicts one embodiment of a method 900 for CSI-RS enhancement, according to embodiments of the disclosure. In various embodiments, the method 900 is performed by a communication device, such as the remote unit 105, the UE 205, and/or the user equipment apparatus 700, described above as described above. In some embodiments, the method 900 is performed by a processor, such as a microcontroller, a microprocessor, a CPU, a GPU, an auxiliary processing unit, a FPGA, or the like.

The method 900 begins and receives 905 a first configuration from a network entity (e.g., from a RAN node), where the first configuration includes one or more of: A) a configuration of indices and a length of at least one first DFT for mapping PDSCH on CSI-RS symbols, and B) a configuration of a number and a length of at least one second DFT for CSI-RS transmission. The method 900 includes receiving 910 a CSI-RS transmission and a PDSCH transmission during a symbol by applying multiple DFTs based on the first configuration. The method 900 includes generating 915 a CSI report based on the received CSI-RS. The method 900 includes transmitting 920 the generated CSI report to the network entity. The method 900 ends.

Figure 10:
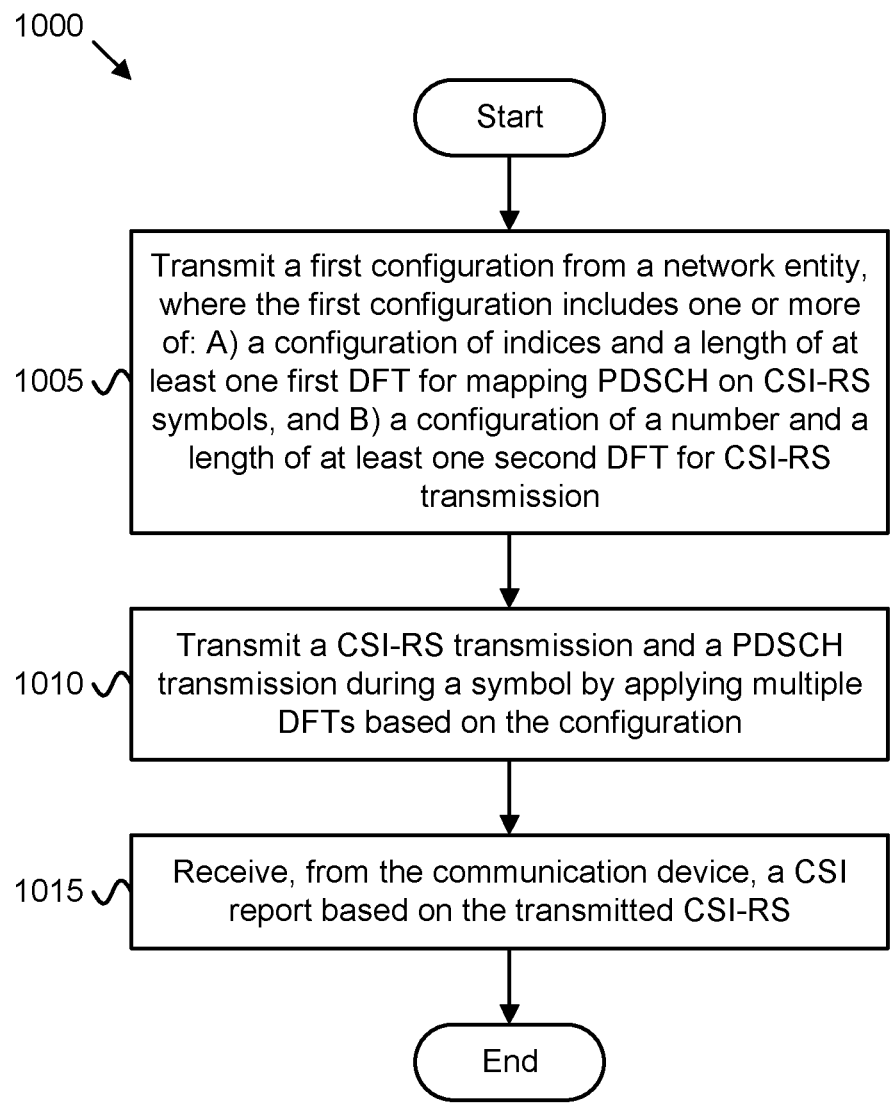
FIG. 10 is a flowchart diagram illustrating one embodiment of a second method for CSI-RS enhancement.

FIG. 10 depicts one embodiment of a method 1000 for CSI-RS enhancement, according to embodiments of the disclosure. In various embodiments, the method 1000 is performed by a network entity, such as the base unit 121, the RAN node 210, and/or the network apparatus 800, described above as described above. In some embodiments, the method 1000 is performed by a processor, such as a microcontroller, a microprocessor, a CPU, a GPU, an auxiliary processing unit, a FPGA, or the like.

The method 1000 begins and transmits 1005 a first configuration to a communication device (e.g., to a UE), the first configuration including one or more of: A) a configuration of indices and a length of one or more first DFTs for mapping PDSCH on CSI-RS symbols, and B) a configuration of a number and a length of one or more DFTs for CSI-RS transmission. The method 1000 includes transmitting 1010 a CSI-RS transmission and a PDSCH transmission during a symbol by applying multiple DFTs based on the configuration. The method 1000 includes receiving 1015, from the communication device, a CSI report based on the transmitted CSI-RS. The method 1000 ends.

Disclosed herein is a first apparatus for CSI-RS enhancement, according to embodiments of the disclosure. The first apparatus may be implemented by a communication device, such as the remote unit 105, the UE 205, and/or the user equipment apparatus 700, described above. The first apparatus includes a transceiver and a processor that receives, from a network entity (e.g., a gNB), a first configuration includes one or more of: A) a configuration of indices and a length of at least one first DFT for mapping on CSI-RS symbols, and B) a configuration of a number and a length of at least one second DFT for CSI-RS transmission. The processor receives a CSI-RS transmission and a PDSCH transmission during a symbol by applying multiple DFTs based on the first configuration. The processor further generates a CSI report based on the received CSI-RS and transmits the generated CSI report to the network entity.

In further embodiments, the first configuration includes an indication of a waveform type for CSI-RS transmission. In some embodiments, the CSI-RS transmission uses a CP-OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the processor further receives a CSI-RS resource set configuration and an indication to use part of the configured time-domain symbols used for CSI-RS for PDSCH transmission (i.e., to multiplex PDSCH and CSI-RS in the same symbol). In one embodiment, the processor further receives an indication of a RE mapping of PDSCH on CSI-RS symbols. In another embodiment, the processor further receives an indication of RB indices for PDSCH on CSI-RS symbols.

In some embodiments, the processor further receives both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the processor further applies a first QCL type-D assumption (i.e., beam) to CSI-RS resource on a symbol and applying a different (i.e., second) QCL type-D assumption to another downlink channel when there is a minimum configured frequency gap between frequency resources for CSI-RS transmission and frequency resources for transmission of the downlink channel.

In some embodiments, the processor further receives a CSI-RS resource set configuration with parameters that indicate one or more of: a DFT length performed for CSI-RS, a number of CSI-RS ports (e.g., parameter nrof-Ports), and/or symbol indices for CSI-RS. In some embodiments, the processor further receives a configuration with an index for RE mapping table via RRC configuration for periodic or semi-persistent CSI-RS resources. In other embodiments, the processor further receives a configuration with an index for RE mapping table via DCI for aperiodic CSI-RS.

In some embodiments, the first configuration includes multiple second DFT for CSI-RS and contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

Disclosed herein is a first method for CSI-RS enhancement, according to embodiments of the disclosure. The first method may be performed by a communication device, such as the remote unit 105, the UE 205, and/or the user equipment apparatus 700, described above. The first method includes receiving a first configuration from a network entity (e.g., a RAN node), where the first configuration includes one or more of: A) a configuration of indices and a length of at least one first DFT for mapping PDSCH on CSI-RS symbols, and B) a configuration of a number and a length of at least one second DFT for CSI-RS transmission. The first method includes receiving a CSI-RS transmission and a PDSCH transmission during a symbol by applying multiple DFTs based on the first configuration. The first method further includes generating a CSI report based on the received CSI-RS and transmitting the generated CSI report to the network entity.

In further embodiments, the first configuration includes an indication of a waveform type for CSI-RS transmission. In some embodiments, the CSI-RS transmission uses a CP-OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the first method includes receiving a CSI-RS resource set configuration and receiving an indication to use part of the configured time-domain symbols used for CSI-RS for PDSCH transmission (i.e., to multiplex PDSCH and CSI-RS in the same symbol). In one embodiment, the first method includes receiving an indication of a RE mapping of PDSCH on CSI-RS symbols. In another embodiment, the first method includes receiving an indication of RB indices for PDSCH on CSI-RS symbols.

In some embodiments, the first method includes receiving both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the first method includes applying a first QCL t e-D assumption (i.e., beam) to CSI-RS resource on a symbol and applying a different (i.e., second) QCL type-D assumption to another downlink channel when there is a minimum configured frequency gap between frequency resources for CSI-RS transmission and frequency resources for transmission of the downlink channel.

In some embodiments, the first method includes receiving a CSI-RS resource set configuration with parameters that indicate one or more of: a DFT length performed for CSI-RS, a number of CSI-RS ports (i.e., parameter nrof-Ports), and/or symbol indices for CSI-RS. In some embodiments, the first method includes receiving a configuration with an index for RE mapping table via RRC configuration for periodic or semi-persistent CSI-RS resources. In other embodiments, the first method includes receiving a configuration with an index for RE mapping table via DCI for aperiodic CSI-RS.

In some embodiments, the first configuration includes multiple second DFT for CSI-RS and contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

Disclosed herein is a second apparatus for CSI-RS enhancement, according to embodiments of the disclosure. The second apparatus may be implemented by a network entity, such as the base unit 121, the RAN node 210, and/or the network apparatus 800, described above. The second apparatus includes a transceiver and a processor that transmits a first configuration to a communication device (e.g., to a UE), where the first configuration includes one or more of: A) a configuration of indices and a length of at least one first DFT for mapping PDSCH on CSI-RS symbols, and B) a configuration of a number and a length of at least one DFT for CSI-RS transmission. Via the transceiver, the processor transmits a CSI-RS transmission and a PDSCH transmission during a symbol by applying multiple DFTs based on the first configuration and receives, from the communication device, a CSI report based on the transmitted CSI-RS.

In further embodiments, the first configuration includes an indication of a waveform type for CSI-RS transmission. In some embodiments, the CSI-RS transmission uses a CP- OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the processor sends, to the UE, a CSI-RS resource set configuration and an indication to use part of the configured time-domain symbols used for CSI-RS for PDSCH transmission (i.e., to multiplex PDSCH and CSI-RS in the same symbol). In one embodiment, the transceiver further transmits, to the UE, an indication of a RE mapping of PDSCH on CSI-RS symbols. In another embodiment, the transmitter further transmits, to the UE, an indication of RB indices for PDSCH on CSI-RS symbols.

In some embodiments, the transceiver further transmits, to the UE, both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the transceiver further applies a first QCL t e-D assumption (i.e., beam) to CSI-RS resource on a symbol and applying a different (i.e., second) QCL type-D assumption to another downlink channel when there is a minimum configured frequency gap between frequency resources for CSI-RS transmission and frequency resources for transmission of the downlink channel.

In some embodiments, the processor further sends, to the UE, a CSI-RS resource set configuration with parameters that indicate one or more of: a DFT length performed for CSI-RS, a number of CSI-RS ports (i.e., parameter nrofPorts), and/or symbol indices for CSI-RS. In some embodiments, the processor further sends, to the UE, a configuration with an index for RE mapping table via RRC configuration for periodic or semi-persistent CSI-RS resources.

In some embodiments, the processor further sends, to the UE, a configuration with an index for RE mapping table via DCI for aperiodic CSI-RS. In some embodiments, the first configuration further includes multiple second DFT for CSI-RS, wherein the first configuration contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

Disclosed herein is a second method for CSI-RS enhancement, according to embodiments of the disclosure. The second method may be performed by a network entity, such as the base unit 121, the RAN node 210, and/or the network apparatus 800, described above. The second method includes transmitting a first configuration to a communication device (i.e., to a UE), the first configuration including one or more of: A) a configuration of indices and a length of one or more first DFTs for mapping PDSCH on CSI-RS symbols, and B) a configuration of a number and a length of one or more DFTs for CSI-RS transmission. The second method includes transmitting a CSI-RS transmission and a PDSCH transmission during a symbol by applying multiple DFTs based on the configuration and receiving, from the communication device, a CSI report based on the transmitted CSI-RS.

In further embodiments, the first configuration includes an indication of a waveform type for CSI-RS transmission. In some embodiments, the CSI-RS transmission uses a CP-OFDM based waveform type and the PDSCH transmission uses a DFT-s-OFDM based waveform type. In other embodiments, the CSI-RS transmission uses a DFT-s-OFDM based waveform type and the PDSCH transmission uses a DFT-s-OFDM based waveform type.

In some embodiments, the one or more first DFT includes a DFT with size of 1 RB or more for DFT-s-OFDM based PDSCH multiplexed with CSI-RS during the symbol. In certain embodiments, the second method further includes transmitting, to the UE, a CSI-RS resource set configuration and an indication to use part of the configured time-domain symbols used for CSI-RS for PDSCH transmission (i.e., to multiplex PDSCH and CSI-RS in the same symbol). In one embodiment, the second method further includes transmitting, to the UE, an indication of a RE mapping of PDSCH on CSI-RS symbols. In another embodiment, the second method further includes transmitting, to the UE, an indication of RB indices for PDSCH on CSI-RS symbols.

In some embodiments, the second method further includes transmitting, to the UE, both CSI-RS and at least one other downlink channel during the symbol (i.e., including same or different RBs) when the QCL type-D assumption (i.e., beam) is common to (i.e., is the same for) both the downlink channel and CSI-RS resources mapped to the symbol.

In some embodiments, the second method further includes applying a first QCL type-D assumption (i.e., beam) to CSI-RS resource on a symbol and applying a different (i.e., second) QCL t e-D assumption to another downlink channel when there is a minimum configured frequency gap between frequency resources for CSI-RS transmission and frequency resources for transmission of the downlink channel In some embodiments, the second method further includes transmitting, to the UE, a CSI-RS resource set configuration with parameters that indicate one or more of: a DFT length performed for CSI-RS, a number of CSI-RS ports (i.e., parameter nrofPorts), and/or symbol indices for CSI-RS. In some embodiments, the second method further includes transmitting, to the UE, a configuration with an index for RE mapping table via RRC configuration for periodic or semi-persistent CSI-RS resources.

In some embodiments, the second method further includes transmitting, to the UE, a configuration with an index for RE mapping table via DCI for aperiodic CSI-RS. In some embodiments, the first configuration further includes multiple second DFT for CSI-RS, wherein the first configuration contains parameters of the multiple second DFT, said parameters including DFT sizes of the multiple second DFT and/or a number of contiguous RBs, the RB indices, number of ports, and CSI-RS symbols indices.

In some embodiments, the first configuration further includes a configuration of indices and a number of RBs for mapping PDSCH on CSI-RS symbols and a configuration of a number of RBs for CSI-RS transmission. In some embodiments, the first configuration further includes one or more of: a set of RB indices for PDSCH transmission on non-CSI-RS symbols, a number of RBs for PDSCH transmission on non-CSI-RS symbols, and/or a first DFT length for PDSCH transmission on non-CSI-RS symbols.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of channel state information ("CSI") reporting at a communication device, the method comprising:
receiving, from a network entity, a first configuration comprising at least one of:
a configuration of indices and a length of one or more first discrete Fourier transforms ("DFT") for mapping physical downlink shared channel ("PDSCH") on Channel State Information Reference Signal ("CSI-RS") symbols; and
a configuration of a number and a length of one or more second DFT for CSI-RS transmission;
receiving a CSI-RS transmission and a PDSCH transmission during a symbol by applying multiple discrete Fourier transforms based on the first configuration;
generating a CSI report based on the received CSI-RS transmission; and
transmitting the generated CSI report to the network entity.

2. The method of claim 1, wherein the first configuration comprises an indication of a waveform type for CSI-RS transmission, wherein the CSI-RS transmission uses a Cyclic Prefix Orthogonal Frequency Division Multiplex ("CP-OFDM") based waveform type and the PDSCH transmission uses a Discrete Fourier Transform Spreading Orthogonal Frequency Division Multiplex ("DFT-s-OFDM") based waveform type.

3. The method of claim 1, wherein the first configuration further comprises an indication of a waveform type for CSI-RS transmission, wherein the CSI-RS transmission uses a Discrete Fourier Transform Spreading Orthogonal Frequency Division Multiplex ("DFT-s-OFDM") based waveform type and the PDSCH transmission uses a DFT-s-OFDM based waveform type.

4. The method of claim 1, wherein the one or more first DFT includes a DFT with size of at least one Resource Block ("RB") for Discrete Fourier Transform Spreading Orthogonal Frequency Division Multiplex ("DFT-s-OFDM") based PDSCH multiplexed with CSI-RS during the symbol.

5. The method of claim 4, further comprising:
receiving a CSI-RS resource set configuration; and
receiving an indication to use part of configured time-domain symbols used for CSI-RS for PDSCH transmission.

6. The method of claim 4, further comprising receiving an indication of a Resource Element ("RE") mapping of PDSCH on CSI-RS symbols or an indication of Resource Block ("RB") indices for PDSCH on CSI-RS symbols.

7. The method of claim 1, wherein the first configuration further comprises:
a configuration of indices and a number of Resource Blocks ("RBs") for mapping PDSCH on CSI-RS symbols; and
a configuration of a number of RBs for CSI-RS transmission.

8. The method of claim 1, further comprising receiving both CSI-RS and at least one other downlink ("DL") channel during the symbol when a Quasi-Co-Location ("QCL") type-D assumption is common to both the DL channel and CSI-RS resources mapped to the symbol.

9. The method of claim 1, further comprising applying a first Quasi-Co-Location ("QCL") type-D assumption to CSI-RS resource on a symbol and applying a different QCL type-D assumption to another downlink ("DL") channel when there is a minimum configured frequency gap between frequency resources for CSI-RS transmission and frequency resources for transmission of the DL channel.

10. The method of claim 1, further comprising receiving a CSI-RS resource set configuration with parameters that indicate one or more of: a DFT length performed for CSI-RS, a number of CSI-RS ports, and/or symbol indices for CSI-RS.

11. The method of claim 1, further comprising receiving a configuration with an index for Resource Element ("RE") mapping table via Radio Resource Control ("RRC") configuration for periodic or semi-persistent CSI-RS resources.

12. The method of claim 1, further comprising receiving a configuration with an index for resource element ("RE") mapping table via downlink control information ("DCI") for aperiodic CSI-RS.

13. The method of claim 1, wherein the first configuration comprises multiple second DFT for CSI-RS, wherein the first configuration contains parameters of the multiple second DFT, said parameters including DFT sizes of the multiple second DFT and/or a number of contiguous Resource Blocks ("RBs"), Resource Block ("RB") indices, number of ports, and CSI-RS symbols indices.

14. A communication apparatus comprising:
a transceiver; and
a processor that:
receives, from a network entity a first configuration comprising at least one of:
a configuration of indices and a length of one or more first discrete Fourier transforms ("DFT") for mapping physical downlink shared channel ("PDSCH") on Channel State Information Reference Signal ("CSI-RS") symbols; and
a configuration of a number and a length of one or more second DFT for CSI-RS transmission;
receives a CSI-RS transmission and a PDSCH transmission during a symbol by applying multiple discrete Fourier transforms based on the first configuration;
generates a channel state information ("CSI") report based on the received CSI-RS transmission; and
transmits the generated CSI report to the network entity.

15. An apparatus in a communication network, the apparatus comprising:
a transceiver; and
a processor that:
transmits, to a communication device, a first configuration comprising at least one of:
a configuration of indices and a length of one or more first discrete Fourier transforms ("DFT") for mapping physical downlink shared channel ("PDSCH") on Channel State Information Reference Signal ("CSI-RS") symbols; and
a configuration of a number and a length of one or more second DFTs for CSI-RS transmission;
transmits a CSI-RS transmission and a PDSCH transmission during a symbol by applying multiple DFTs based on the first configuration; and
receives, from the communication device, a channel state information ("CSI") report based on the transmitted CSI-RS.

* * * * *